US011323242B2

(12) United States Patent
Awad et al.

(10) Patent No.: US 11,323,242 B2
(45) Date of Patent: May 3, 2022

(54) SYSTEM, SECURE PROCESSOR AND METHOD FOR RESTORATION OF A SECURE PERSISTENT MEMORY

(71) Applicant: UNIVERSITY OF CENTRAL FLORIDA RESEARCH FOUNDATION, INC., Orlando, FL (US)

(72) Inventors: Amro Awad, Orlando, FL (US); Mao Ye, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 350 days.

(21) Appl. No.: 16/447,215

(22) Filed: Jun. 20, 2019

(65) Prior Publication Data
US 2019/0394021 A1    Dec. 26, 2019

Related U.S. Application Data

(60) Provisional application No. 62/687,360, filed on Jun. 20, 2018.

(51) Int. Cl.
*H04L 9/06* (2006.01)
*H03M 13/05* (2006.01)
(Continued)

(52) U.S. Cl.
CPC .......... *H04L 9/0618* (2013.01); *G06F 3/0623* (2013.01); *G06F 3/0632* (2013.01);
(Continued)

(58) Field of Classification Search
CPC .... G06F 16/164; G06F 16/2228; G06F 16/13; G06F 3/0623; G06F 3/0632;
(Continued)

(56) References Cited

U.S. PATENT DOCUMENTS

2009/0125726 A1*  5/2009 Iyer ................ G11C 16/22
                                                            713/189
2021/0117191 A1*  4/2021 Cunningham ......... G06F 8/456

OTHER PUBLICATIONS

A. Awad, P. Manadhata, S. Haber, Y. Solihin, and W. Horne, "Silent shredder: Zero-cost shredding for secure non-volatile main memory controllers," in Proceedings of the Twenty-First International Conference on Architectural Support for Programming Languages and Operating Systems, ser. ASPLOS '16. New York, NY, USA: ACM, 2016. [Online]. http://doi.acm.org/10.1145/2872362.2872377; 15 pages.

(Continued)

*Primary Examiner* — Hee K Song
(74) *Attorney, Agent, or Firm* — Timothy H. Van Dyke; Wolter, Van Dyke, Davis, PLLC

(57) ABSTRACT

Disclosed herein are embodiment that are directed to a method comprising storing each encrypted data block, of a cyphertext page, with corresponding encrypted error correction code (ECC) bits in a persistent memory device (PMD). In exemplified embodiments, the encrypted ECC bits verify both an encryption counter value of an encryption operation and a plaintext block of the cyphertext page from a decryption operation. In other embodiments, the method includes decrypting, using the decryption operation during a read operation of a memory controller, a respective one block of the cyphertext file and the corresponding encrypted ECC bits stored in the PMD using a current counter value to form the plaintext block and decrypted ECC bits. Further, the may include verifying the plaintext block with the decrypted ECC bits; and performing a security check of the encryption counter value in response to the plaintext block failing the verification, using the decrypted ECC bits. A system and secure processor that are configured to perform the disclosed methods are provided.

20 Claims, 20 Drawing Sheets

(51) Int. Cl.
  G06F 16/16    (2019.01)
  G06F 16/22    (2019.01)
  G06F 16/13    (2019.01)
  G06F 3/06     (2006.01)
  G06F 12/0882  (2016.01)
  G06F 21/62    (2013.01)

(52) U.S. Cl.
  CPC .......... *G06F 3/0634* (2013.01); *G06F 3/0656* (2013.01); *G06F 3/0659* (2013.01); *G06F 3/0673* (2013.01); *G06F 12/0882* (2013.01); *G06F 16/13* (2019.01); *G06F 16/164* (2019.01); *G06F 16/2228* (2019.01); *G06F 21/6227* (2013.01); *H03M 13/05* (2013.01); *G06F 2212/304* (2013.01); *G06F 2221/2101* (2013.01)

(58) Field of Classification Search
  CPC .... G06F 3/0634; G06F 3/0656; G06F 3/0659; G06F 3/0673; G06F 12/0882; G06F 21/6227; G06F 2212/304; G06F 2221/2101; H03M 13/05
  See application file for complete search history.

(56) References Cited

OTHER PUBLICATIONS

S. Liu, A. Kolli, J. Ren, and S. Khan, "Crash consistency in encrypted non-volatile main memory systems," in 2018 IEEE International Symposium on High Performance Computer Architecture (HPCA), Feb. 2018, 14 pages.

G. Saileshwar, P. J. Nair, P. Ramrakhyani, W. Elsasser, and M. K. Qureshi, "Synergy: Rethinking secure-memory design for error-correcting memories," in The 24th International Symposium on High-Performance Computer Architecture (HPCA), 2018, pp. 454-465.

CC. Yan, D. Englender, M. Prvulovic, B. Rogers, and Y. Solihin, "Improving cost, performance, and security of memory encryption and authentication," in ACM SIGARCH Computer Architecture News, vol. 34, No. 2. IEEE Computer Society, 2006, 12 pages.

V. Young, P. J. Nair, and M. K. Qureshi, "Deuce: Write-efficient encryption for non-volatile memories," in Proceedings of the Twentieth International Conference on Architectural Support for Programming Languages and Operating Systems, ser. ASPLOS '15. New York, NY, USA: ACM, 2015. [Online]. Available: http://doi.acm.org/10.1145/2694344.2694387, 12 pages.

Wikipedia, "ECC Memory" Feb. 8, 2018, https://en.wikipedia.org/w/index.php?title=ECC_memory&oldid=824700349; 7 pages.

* cited by examiner

SYSTEM, SECURE PROCESSOR AND METHOD FOR RESTORATION OF A SECURE PERSISTENT MEMORY

CO-PENDING APPLICATIONS

This application claims priority benefit of Provisional Application No. 62/687,360, filed Jun. 20, 2018, titled "TECHNIQUES FOR SECURE BYTE-ADDRESSABLE PERSISTENT MEMORY MANAGING," to the same assignee University of Central Florida Research Foundation, Inc., and being incorporated herein by reference as if set forth in full below.

BACKGROUND

The embodiments are directed to system, secure processor and method for restoration of secure persistent memory.

Unlike traditional storage systems, emerging non-volatile memory (NVM) technologies are expected to be offered on a memory-module form factor, thus can be accessed through the memory bus using typical memory load/store operations. Compared to other storage technologies, such as flash-based drives, emerging NVMs are expected to be orders of magnitude faster, can endure orders of magnitude more writes, and have promising densities. Accordingly, emerging NVMs are expected to revolutionize storage systems.

SUMMARY

The embodiments are for system, secure processor and method for restoration and recovery of a secure persistent memory. Non-transitory, tangible computer readable medium for restoration and recovery of a secure persistent memory may be provided.

A set of embodiments includes a method comprising storing each encrypted data block, of a cyphertext page in a cyphertext file, with corresponding encrypted error correction code (ECC) bits in a persistent memory device (PMD). The encrypted ECC bits verify both an encryption counter value of an encryption operation and a plaintext block of the cyphertext page from a decryption operation. The method includes decrypting, using the decryption operation during a read operation of a memory controller on a secure processor, a respective one block of the cyphertext file and the corresponding encrypted ECC bits stored in the PMD using a current counter value to form the plaintext block and decrypted ECC bits. The method includes verifying the plaintext block with the decrypted ECC bits; and performing a security check of the encryption counter value in response to the plaintext block failing the verification, using the decrypted ECC bits.

A set of embodiments includes a secure processor coupled to a tangible, non-transitory persistent memory device (PMD) to store each encrypted data block, of a cyphertext page in a cyphertext file, with corresponding encrypted error correction code (ECC) bits. The processor comprising: a memory controller configured to interface with the PMD; and an encryption/decryption engine configured to decrypt, using a decryption operation during an operation of the memory controller, a respective one block of the cyphertext file and the corresponding encrypted ECC bits stored in the PMD using a current counter value to form the plaintext block and decrypted ECC bits and verify via a verification module in the engine the plaintext block with the decrypted ECC bits. The processor include a processing unit configured to execute instruction of a security check module to perform a security check of an encryption counter values in response to the plaintext block failing the verification, using the decrypted ECC bits wherein the encrypted ECC bits verify both the encryption counter value of an encryption operation and raw data of a plaintext block of the cyphertext page from the decryption operation.

A set of embodiments includes a system comprising a persistent memory device to store each encrypted data block, of a cyphertext page in a cyphertext file, with corresponding encrypted error correction code (ECC) bits. The encrypted ECC bits verify both an encryption counter value of an encryption operation and a plaintext block of the cyphertext page from a decryption operation. The system includes a secure processor comprising a memory controller configured to: decrypt, using the decryption operation during a read operation of a memory controller, a respective one block of the cyphertext file and the corresponding encrypted ECC bits stored in the PMD using a current counter value to form the plaintext block and decrypted ECC bits; verify the plaintext block with the decrypted ECC bits; and perform a security check of the encryption counter value in response to the plaintext block failing the verification, using the decrypted ECC bits.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1A:
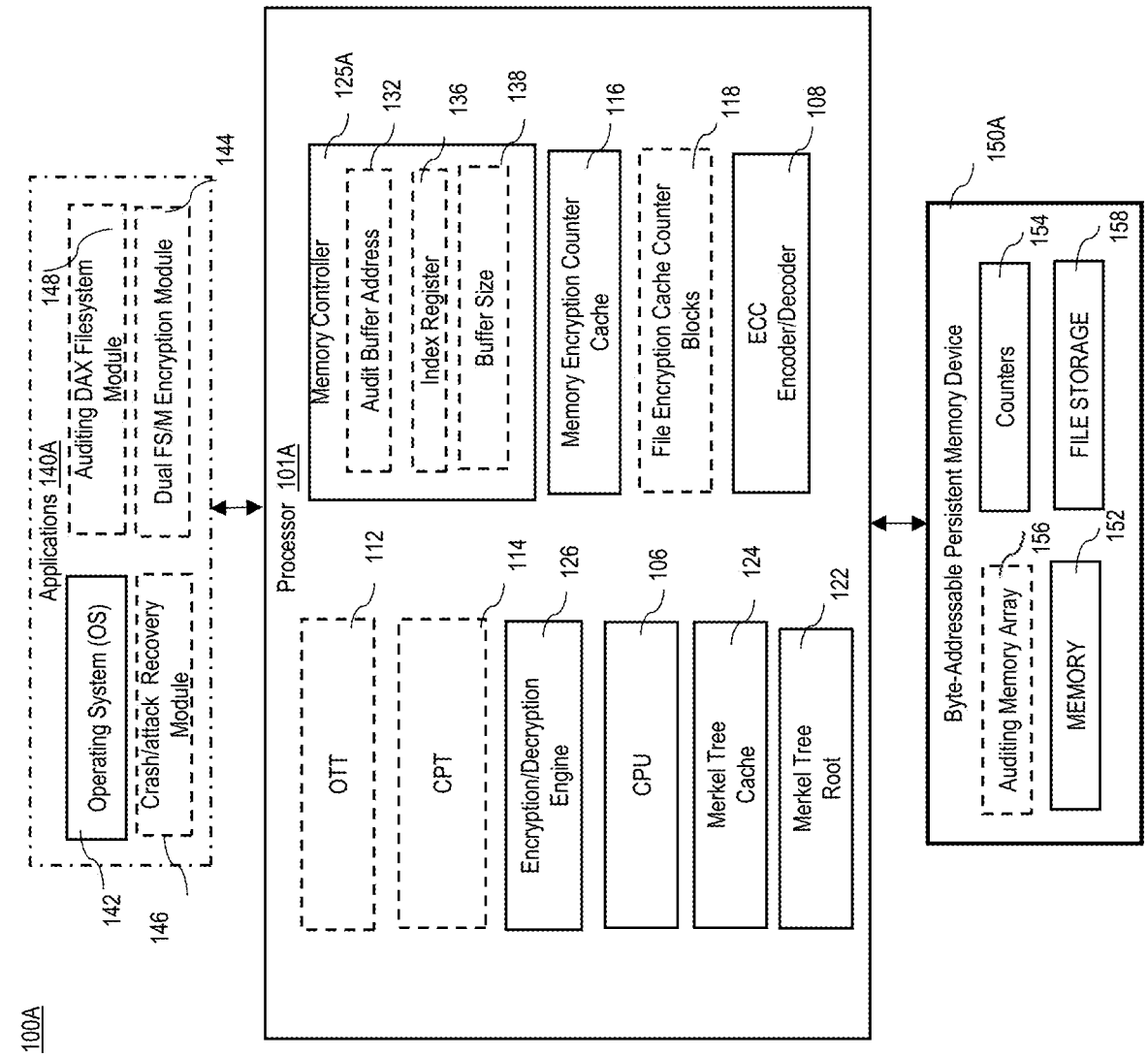
FIG. 1A illustrates a secure byte-addressable persistent memory managing system according to some embodiments.

A method and system are described for managing counter-mode encryption/decryption of secure persistent memory devices, such as a secure byte-addressable persistent memory device. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The term "cache" related to memory hardware used to store information such as bits, bytes and/or blocks of information therein.

Some embodiments of the invention are described below in the context of management of persistent memory devices for counter-value recovery of encryption counters in counter-mode encryption processes. However, the invention and embodiments are not limited to this context. In other embodiments, the invention is described below in the context of management of byte-addressable persistent memory devices for selective dual filesystem and memory (FS/M) encryption/decryption in counter-mode encryption processes. Still further, other embodiments of the invention are described below in the context of management of persistent memory devices for auditing direct access to file (DAX) filesystem files in encrypted memory devices and non-encrypted memory devices.

The solutions herein may include a co-design of hardware and software implementations in a processor chip and/or secure persistent memory device.

Counter-mode encryption security is considered a highly secure encryption methodology. Specifically, counter-mode encryption may prevent snooping attacks, dictionary-based attacks, known-plaintext attacks and replay attacks, for example, in some instances. However, persisting encryption counters used in the counter-mode encryption is not only critical for system restoration, such as, without limitation, after a system crash, but also a security requirement. Reusing old/wrong encryption counters (i.e., those which have not been persisted on memory during crash) can result in meaningless data after decryption. Moreover, losing most-recent counters entails a variety of cyberattacks wherein counter-mode encryption security strictly depends on the uniqueness of encryption counters used for each encryption. The term "cyberattack" is interchangeable with the term "attack."

The techniques herein may manage the secure persistent memory device through at least one of a crash recovery mechanism and attack recovery mechanism for counters in a counter-mode encryption process; and selective dual files system/memory (FS/M) encryption methodology incorporating filesystem encryption counter blocks and memory encryption counter blocks. The techniques herein may manage the persistent memory device through filesystem auditing.

FIG. 1A illustrates a secure persistent memory managing (PMM) system 100A according to some embodiments, for use in a computing system, as will be described in more detail in relation to FIG. 5 and chip set, as will be described in more detail in relation to FIG. 6.

Figure 5:
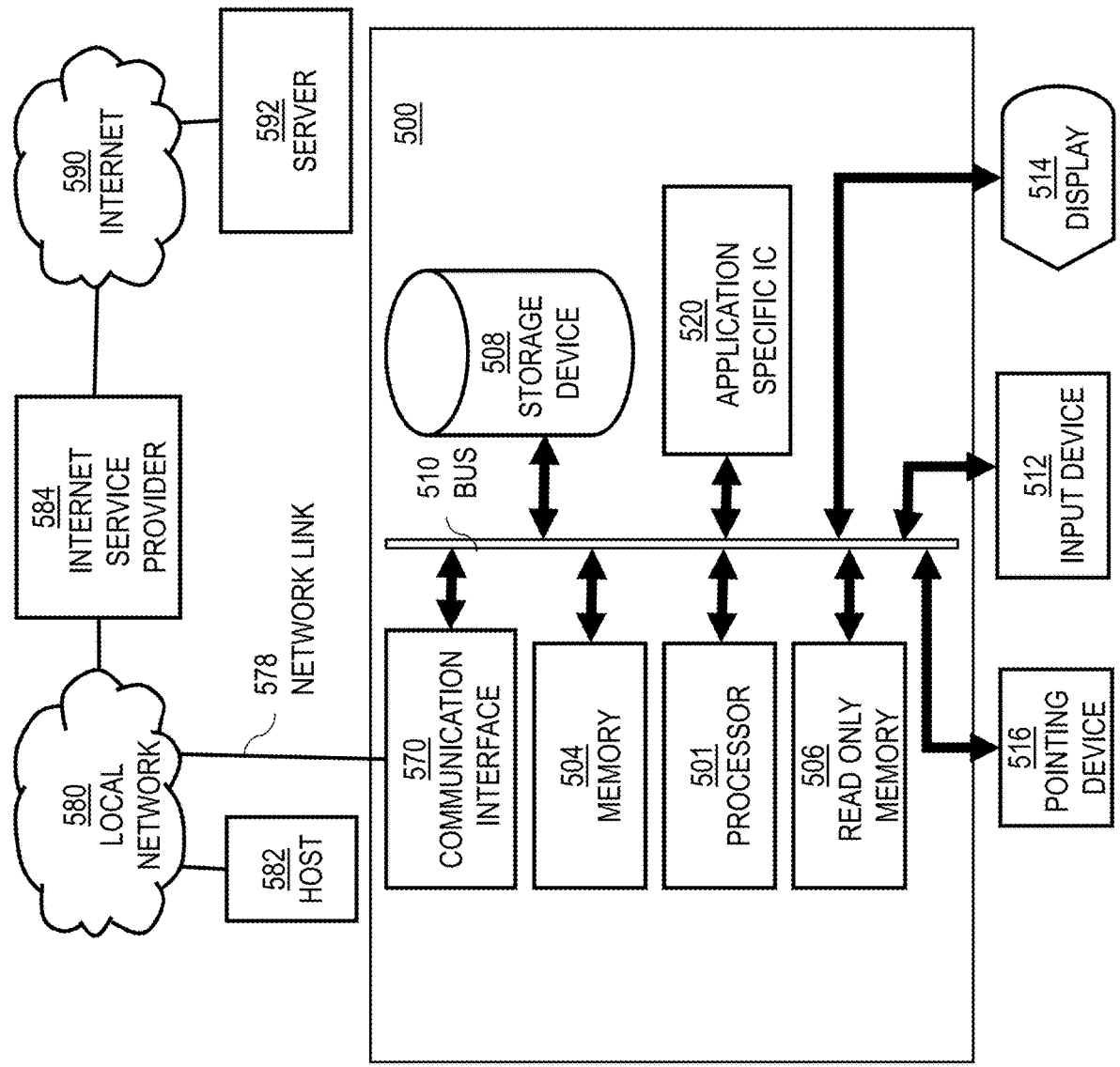
FIG. 5 illustrates a block diagram of a computer system upon which embodiments of the invention may be implemented.

The PMM system 100A may be incorporated in a computing system (FIG. 5). The PMM system 100A may comprise a physically secure processor 101A and an attacker accessible persistent memory device 150A in communication therewith. The persistent memory device (PMD) 150A may be incorporated in memory 605, as described in relation to FIG. 6. The PMD 150A includes a portion used as memory 152 and a portion used to store directly accessible files 158 in a files system. The physically secured processor 101A may include a MT root 122 and a Merkel Tree (MT) cache 134. In some embodiments, the Merkel Tree cache 134, but not the Merkel Tree root 122, is on the PMD 150A. The details of the MT cache 134 and MT root 122 are described herein. The dashed boxes illustrated in FIG. 1A denote that the boxes are optional in some embodiments and may be omitted. Furthermore, the dashed boxes in the processor 101A and the persistent memory device 150A also denote added hardware components for carrying out the methods described herein. Added hardware may not include additional hardware per se but instead designation and assignment of available memory registers/buffers, circuits, and communication paths for performing the acts described herein.

The PMM system 100A may comprise encryption/decryption engine 126, central processing unit (CPU) 106 and memory controller 125A. The encryption/decryption engine 126 may be configured as one or more engines. For example, the encryption/decryption engine 126 may perform memory encryption/decryption based on a counter-mode encryption scheme using a processor/memory encryption key known by the processor 101A. Alternately, the engine 126 may perform memory encryption/decryption using a processor/memory encryption key and filesystem encryption/decryption using a designated file encryption key (FEK) for the filesystem file using a counter-mode encryption scheme. In some embodiments, the memory encryption/decryption (first phase) and the filesystem encryption/decryption (second phase) may be performed in series. However, the corresponding encryption/decryption pads for the first phase and the second phase may be generated in parallel. The terms "first" and "second" are not intended to denote priority of one phase over another. In some embodiments, by way of non-limiting example, the first phase may include the filesystem encryption/decryption using bitwise modular addition; and the second phase may include the memory encryption/decryption using bitwise modular addition.

The PMM system 100A may include memory encryption counter cache 116 for use in encrypting data to be stored in the persistent memory device 150A which provides counters 154 configured to be loaded in the counter cache 116 and 118. The counters in the counter cache 116 are used to populate fields of an initialization vector (IV) used in the encryption operation, for example. The IV is paired with a corresponding encryption key to generate an encryption/decryption pad used to encrypt/decrypt the data of a file. The terms "cache counters," "counters" and "counter cache" may be used interchangeably herein.

The PMM system 100A may comprise applications 140A denoted in a dash, dot box, configured with instructions or program code to execute one or more of the method blocks/steps described herein. The applications 140A may be stored in memory devices shown in FIG. 5. For the sake of brevity, not all applications for operating the processor and computing system (FIG. 5) are described herein such as for displaying files, interfacing with user input devices, network communications, etc., well known in computing technology.

The applications 140A may include an operating system (OS) 142. The applications 140A may comprise crash/attack recovery module 146, denoted in dashed box, for managing the persistent memory device 150A through at least one of a crash recovery mechanism and an attack recovery mechanism for counters in a counter-mode encryption process. The recovery of the counter values is described in relation to FIG. 2A.

The processor 101A may include error correction code (ECC) encoder/decoder 108 configured to encode data of a file with a generated ECC and decode decrypted data with the ECC. The ECC may be configured to correct one or more errors in the decrypted data using known encoding/decoding and error correction schemes. Recovery, whether caused by a crash or cyberattack, may use the ECC for a security check of the encryption counter values, after decryption and decoding, via a verification module 147. The crash/attack recovery module 146 may be configured to recover the counter value if the counter value is invalid, as described in more detail in relation to FIG. 2A-2B and FIGS. 13 and 14. An invalid counter value may be the result of a system crash or a cyberattack. In some embodiments, a set of N counter values may be checked to recover the most-recent counter value using the ECC bits, where N is an integer.

After all memory locations are vested, the MT cache 134 may be reconstructed with the recovered counter values to build up any corresponding intermediate nodes and the MT root 122. Additionally, the resulting MT root 122 (FIG. 1A) may be compared with that saved and kept in the processor 101A. However, if a mismatch occurs, then the data integrity in the memory device cannot be verified and it is very likely that an attacker has replayed both counter and corresponding encrypted data+ECC blocks, in the case of a cyberattack. The mismatch may occur in the case of a crash. The verification module 147 may be configured to determine whether a mismatch has occurred based on comparing a possible restored root of a possible restored Merkle Tree.

The processor 101A may include an open tunnel table 112, a current process table 114 and filesystem encryption cache counter blocks 118, denoted in dashed boxes. Further, the applications 140A may include a dual FS/M encryption module 144, denoted in a dashed box, for managing selective dual FS/M encryption methodology using the open tunnel table 112, current process table 114 and filesystem encryption cache counter blocks 118. The dual FS/M encryption module 144 is configured to perform dual counter-mode encryption by incorporating filesystem encryption cache counter blocks 118 and memory encryption counter cache 116. The dual FS/M encryption module 144 supports selectively encrypted DAX filesystem files and encryption of the persistent memory device 150A.

The current process table (CPT) 114 may include, for each core of a plurality of cores of the CPU 106 on the processor 101A, a current process identification (PID) by corresponding core identification (CID). Any current PID may open one or more stored files 158 in memory device 150A. Additionally, the open tunnel table (OTT) 112 may include, for each current PID, an associated FID and file encryption key (FEK), if present. One or more files may not be encrypted. Thus, non-encrypted files would not have a corresponding FEK. Moreover, each different encrypted file may have its own file encryption key which may be set by a user, administrator or other means. The OTT 112 allows different file encryption keys to be tracked and subsequently changed. The dual FS/M encryption module 144 employs the instructions to generate the data (i.e., PID, FID, CID and FEK) for populating the CPT 114 and OTT 112, as well as, use such data for selective dual encryption of a DAX filesystem file. The memory encryption counter cache 116 are modified with a FID field and a file type (File ?) field wherein, if the file is non-encrypted, the dual FS/M encryption module 144 does not look-up the FEK since the file would not have such an FEK, to perform memory counter-mode encryption. The File? Field also indicates whether a counter block 154 is for a file or for a memory 152 that has a processor specific encryption key.

The OTT 112, CPT 114 and file encryption cache counter blocks 118 are designated hardware components, and these components (i.e., the OTT 112 and CPT 114) may be physically near the memory controller 125A. In other words, the OTT 112 and CPT 114 may be on-board the processor chip of processor 101A. While the OTT 112 and CPT 114 are shown outside of the memory controller 125A, in some embodiments the OTT 112 and CPT 114 may be added within the memory controller 125A.

Nonetheless, if the file is an encrypted filesystem file, the dual FS/M encryption module 144 uses a processor/memory encryption key to generate a memory encryption/decryption pad for use in a first phase of an encryption process; and looks up the FEK of the file to generate a filesystem encryption/decryption pad for use in a second phase of the encryption process using the result of the first phase, by way of non-limiting example. The reverse may be used in some embodiments. In other words, the first phase may use the filesystem encryption/decryption pad while the second phase encrypts the result of the first phase using the memory encryption/decryption pad. The encryption and decryption operations may be symmetrical operations.

The applications 140A may include auditing DAX filesystem module 148 for managing the persistent memory device through filesystem auditing. The memory controller 125A may be modified to include one or more of an audit buffer address 132, an index register 136 and a buffer size 138, each of which is denoted as a dashed box. The persistent memory device 156 may include an auditing memory array 156, denoted in a dashed box.

In an embodiment, a global auditing region may be designated in the memory controller 125A to track accesses of all the DAX filesystem files or those files designated for auditing. In this embodiment, the global auditing region include an audit (global) buffer address 132, index register 136 and buffer size 138. Correspondingly, the auditing memory array 156 includes a global buffer for which to write a file's audit information, such as when reading and writing file data in the persistent memory device 150A. Global buffer may be physically contiguous, and its physical address and size are communicated initially to the memory controller 125A wherein the global buffer may be shared across the filesystem files, for example.

In another embodiment, a per-file auditing region may be used to hold the transactions history of the corresponding DAX filesystem file in the auditing memory array 156 of the encrypted persistent memory device 150A. Here, the per-file auditing region, the audit buffer address 132 may correspond to an audit page associated with a data page of an accessed filesystem file. The memory controller 125A may generate per-cacheline auditing information which may include the FID, an audit indicator (Audit?) and an audit mode. The audit indicator (Audit?) may indicate whether the file is to be audited. For example, if the file is audited, the audit information or audit metadata information is stored in an auditing page with or adjacent to the data page of the filesystem file in the persistent memory device 150A. The audit mode may include a code to denote one of no auditing, read only access, write only access, and both read and write accesses.

Although processes, equipment, and/or data structures are depicted in FIG. 1A as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example, in some embodiments, the open tunnel table (OTT) 112, current processes table (CPT) 114 and dual filesystem/memory encryption module 144 may be omitted. In some embodiments, the auditing DAX filesystem module 148 and auditing memory array 156 may be omitted. In other embodiments, the crash/attack recovery module 146 may be omitted. Still further, the data associated with the OTT 112 and CPT 114 may be replaced with certain metadata storage, for some applications which do not support the OTT 112 and CPT 114.

Figure 1B:
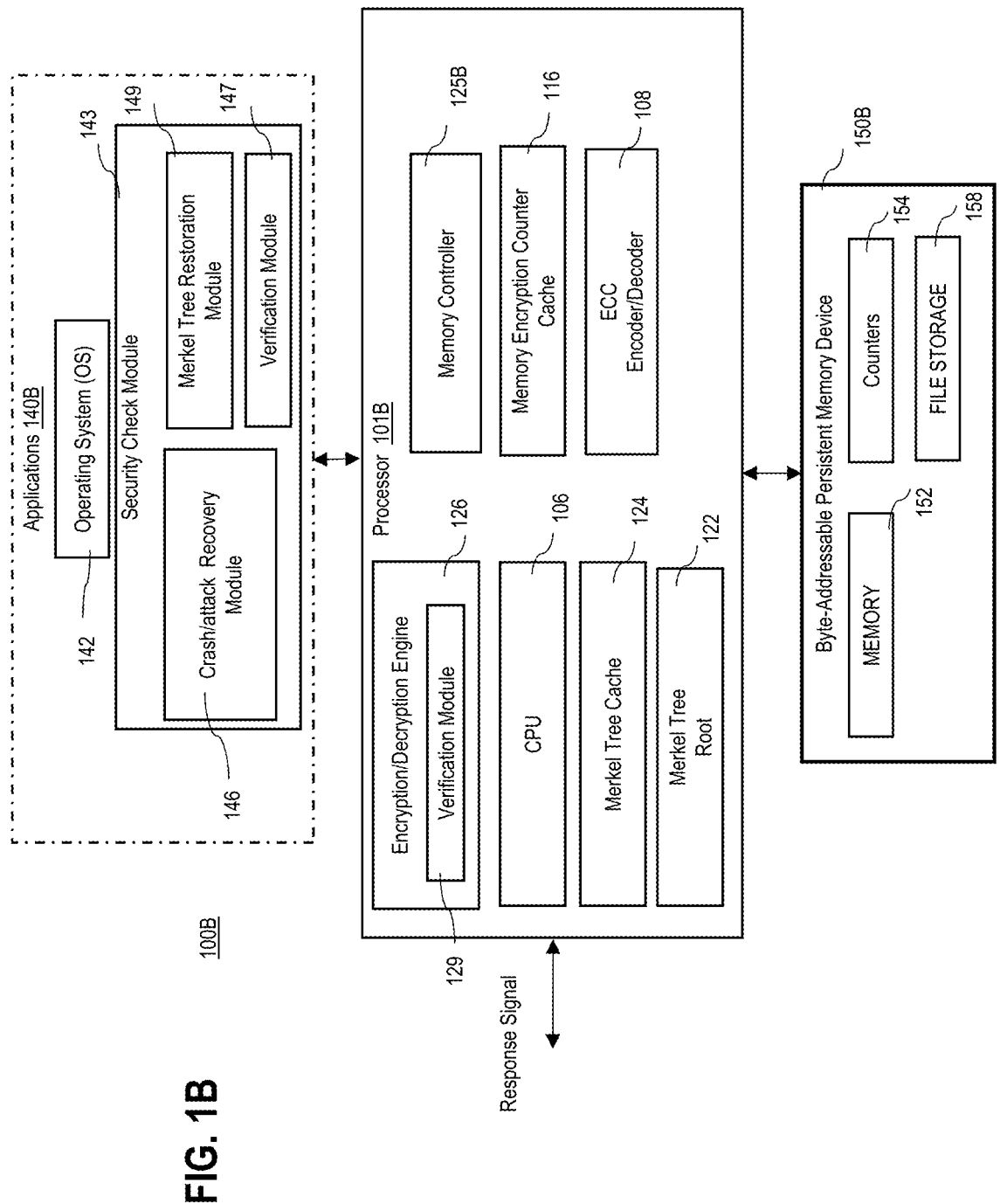
FIG. 1B illustrates a secure persistent memory managing system with restoration of secure persistent memory according to some embodiments.

FIG. 1B illustrates a secure persistent memory managing (PMM) system 100B according to some embodiments, for use in a computing system, as will be described in more detail in relation to FIG. 5 and chip set, as will be described in more detail in relation to FIG. 6. FIG. 1B is similar to FIG. 1A. However, the operation of FIG. 1B is directed to the operation of secure restoration of secure persistent memory. Persistent memory and non-volatile memory (NVM) are used interchangeably herein. Likewise, the term persistent memory device (PMD) and NVM device are used interchangeably herein.

The PMM system 100B may be incorporated in a computing system (FIG. 5). The PMM system 100B may comprise a physically secure processor 101B and an attacker accessible persistent memory device 150B in communication therewith. The persistent memory device (PMD) 150B may be incorporated in memory 605, as described in relation to FIG. 6. The PMD 150B includes a portion used as memory 152 and a portion used to store directly accessible files 158 in a files system. The physically secured processor 101B may include a MT root 122 and a Merkel Tree (MT) cache 124. In some embodiments, the Merkel Tree cache 124, but not the Merkel Tree root 122, is on the PMD 150B. The details of the MT cache 124 and MT root 122 are described herein. Added hardware may not include additional hardware per se but instead designation and assignment of available memory registers/buffers, circuits, and communication paths for performing the acts described herein. The processor 101B may produce a response signal indicative of the read data is unverifiable, by way of non-limiting example.

The PMM system 100B may comprise encryption/decryption engine 126, central processing unit (CPU) 106 and memory controller 125B. The encryption/decryption engine 126 may be configured as one or more engines. For example, the encryption/decryption engine 126 may perform memory encryption/decryption based on a counter-mode encryption scheme using a processor/memory encryption key known by the processor 101B. Alternately, the engine 126 may perform memory encryption/decryption using a processor/memory encryption key using a counter-mode encryption scheme the memory encryption/decryption may use bitwise modular addition.

The encryption/decryption engine 126 is configured to decrypt, using a decryption operation during an operation of a memory controller, a respective one block of the cyphertext file and the corresponding encrypted ECC bits stored in the PMD using a current counter value to form the plaintext block and decrypted ECC bits. Thus, the encryption/decryption engine 126 may include a verification module 199 to verify the plaintext block with the decrypted ECC bits using known error correction schemes. The engine 126 may work in concert with the encoder/decoder 108 to encode data prior to encryption and decode data after decryption, using known encoding and decoding techniques. The verification module 109 may be software instructions to perform the verification process.

The processor 101B may execute instructions to perform a security check process by a security check module 143 configured to perform a security check of encryption counter values in response to the plaintext block failing the verification, using the decrypted ECC bits. The encrypted ECC bits verify both the encryption counter value of an encryption operation and raw data of a plaintext block of the cyphertext page from the decryption operation. Therefore, the modules in applications 140B are also modules of the processor 101B by virtue of the fact, the processor 101B executes the instructions of such modules stored in a memory device.

The term raw data as used herein is data in a plaintext block that unencrypted and/or unencoded data.

The PMM system 100B may include memory encryption counter cache 116 for use in encrypting data to be stored in the persistent memory device 150B which provides counters 154 configured to be loaded in the counter cache 116. The cache counters in the counter cache 116 are used to populate fields of an initialization vector (IV) used in the encryption operation, for example. The IV is paired with a corresponding encryption key to generate an encryption/decryption pad used to encrypt/decrypt the data of a file.

The PMM system 100B may comprise applications 140B denoted in a dash, dot box, configured with instructions or program code to execute one or more of the method blocks/steps described herein. The applications 140B may be stored in memory devices shown in FIG. 5. For the sake of brevity, not all applications for operating the processor and computing system (FIG. 5) are described herein such as for displaying files, interfacing with user input devices, network communications, etc., well known in computing technology.

The processor 101B executes programing instructions to perform the functions and acts as described herein. The processor 101B may employ at least one central processing unit (CPU) 106 and memory controller 125B. The operation of the engine 126 may be performed in concert with the CPU 106.

The applications 140B may include an operating system (OS) 142. The applications 140B may comprise crash/attack recovery module 146 for managing the persistent memory device 150B through at least one of a crash recovery mechanism and an attack recovery mechanism for counters in a counter-mode encryption process. The recovery of the counter values is described in relation to FIG. 2A-2B.

The applications 140B may include a Merkle Tree restoration module 149 configured to, upon execution by the processor 101B, restore a Merkle Tree (MT) by using a most-recent counter value of encryption counters to reconstruct the MT that has a restored root that matches a current root stored in the secure processor, in response to the plaintext block failing the verification.

The processor 101B may include error correction code (ECC) encoder/decoder 108 configured to encode data of a file with a generated ECC and decode decrypted data with the ECC. The ECC may be configured to correct one or more errors in the decrypted data. Recovery, whether caused by a crash or cyberattack, may use the ECC for a security check of the encryption counter values, after decryption and decoding. The crash/attack recovery module 146 may be configured to recover the counter value if the counter value is invalid, as described in more detail in relation to FIG. 2A-2B. An invalid counter value may be the result of a system crash or a cyberattack. In some embodiments, a set of N counter values may be checked to recover the most-recent counter value using the ECC bits, where N is an integer.

After all memory locations are vested, the MT cache 124 may be reconstructed with the recovered counter values to build up any corresponding intermediate nodes and the MT root 122. Additionally, the resulting MT root 122 (FIG. 1B) may be compared with that saved and kept in the processor 101B. However, if a mismatch occurs, then the data integrity in the memory device cannot be verified and it is very likely that an attacker has replayed both counter and corresponding encrypted data+ECC blocks, in the case of a cyberattack. The mismatch may occur in the case of a crash.

Although processes, equipment, and/or data structures are depicted in FIG. 1B as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2A:
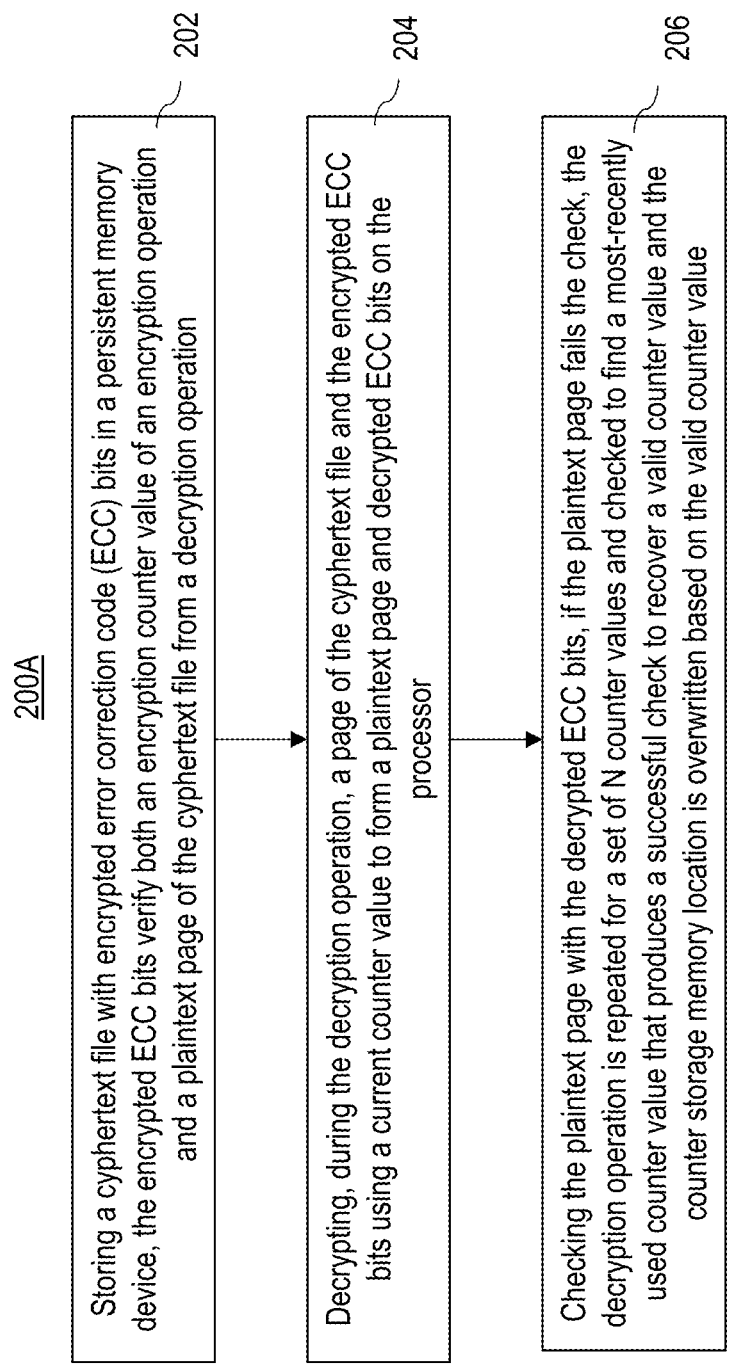
FIG. 2A illustrates a flowchart of a method for managing decryption and counter values with error correction codes (ECC) for a secure persistent memory, according to some embodiments.

FIG. 2A illustrates a flowchart of a method 200A for managing decryption and counter values with error correction codes (ECC) for a secure persistent memory, according to some embodiments. The methods described herein will be in reference to the PMM system 100A or 100B of FIG. 1A or 1B. The inventors use error-correction codes (ECC) bits for decoding, via the ECC encoder/decoder 108, a decrypted file and, additionally, to provide a security check for the encryption counters. The memory controller 125A or 125B (FIG. 1A or FIG. 1B) may be configured to relax the strict atomic persistence requirement through secure and fast recovery of lost encryption counters due to a crash or cyberattack using the ECC bits after decryption and decoding of the corresponding file.

The method 200A may comprise, at block 202, storing a cyphertext file with encrypted error correction code (ECC) bits in a persistent memory device 150A or 150B. The encrypted ECC bits verify both an encryption counter value of an encryption operation and a plaintext page of the cyphertext file from a decryption operation.

The method 200A may include, at block 204, decrypting, during the decryption operation, a page of the cyphertext file and the encrypted ECC bits using a current counter value to form a plaintext page and decrypted ECC bits on the processor. The method 200A may include, at block 206, checking the plaintext page with the decrypted ECC bits, if the plaintext page fails the check, the decryption operation is repeated for a set of N counter values and checked to find a most-recently used counter value that produces a successful check to recover a valid counter value and the counter storage memory location is overwritten based on the valid counter value.

The method 200A may comprise overwriting the counter storage memory location with the recovered or valid counter value. As previously described, the Merkle Tree (MT) cache 134 may be reconstructed with the recovered counter values to build up any intermediate nodes and the MT root 122 (FIG. 1A or FIG. 1B). In a further method block/step, for example, the resulting MT root 122 (FIG. 1A or FIG. 1B) based on the reconstructed MT cache 134 may then be compared with that saved and kept in the processor 101A or 101B (FIG. 1A or FIG. 1B). The method may determine that a mismatch occurred wherein the root mismatch is indicative of that the data integrity of the memory device cannot be verified. In some embodiments, the mismatch may be indicative that an attacker has replayed both counter and corresponding encrypted data+ECC blocks.

Although blocks/steps are depicted in FIG. 2A, as integral blocks/steps in a particular order for purposes of illustration, in other embodiments, one or more blocks/steps, or portions thereof, are performed in a different order, or overlapping in time, in series or in parallel, or are omitted, or one or more additional blocks/steps are added, or the method is changed in some combination of ways.

Figure 2B:
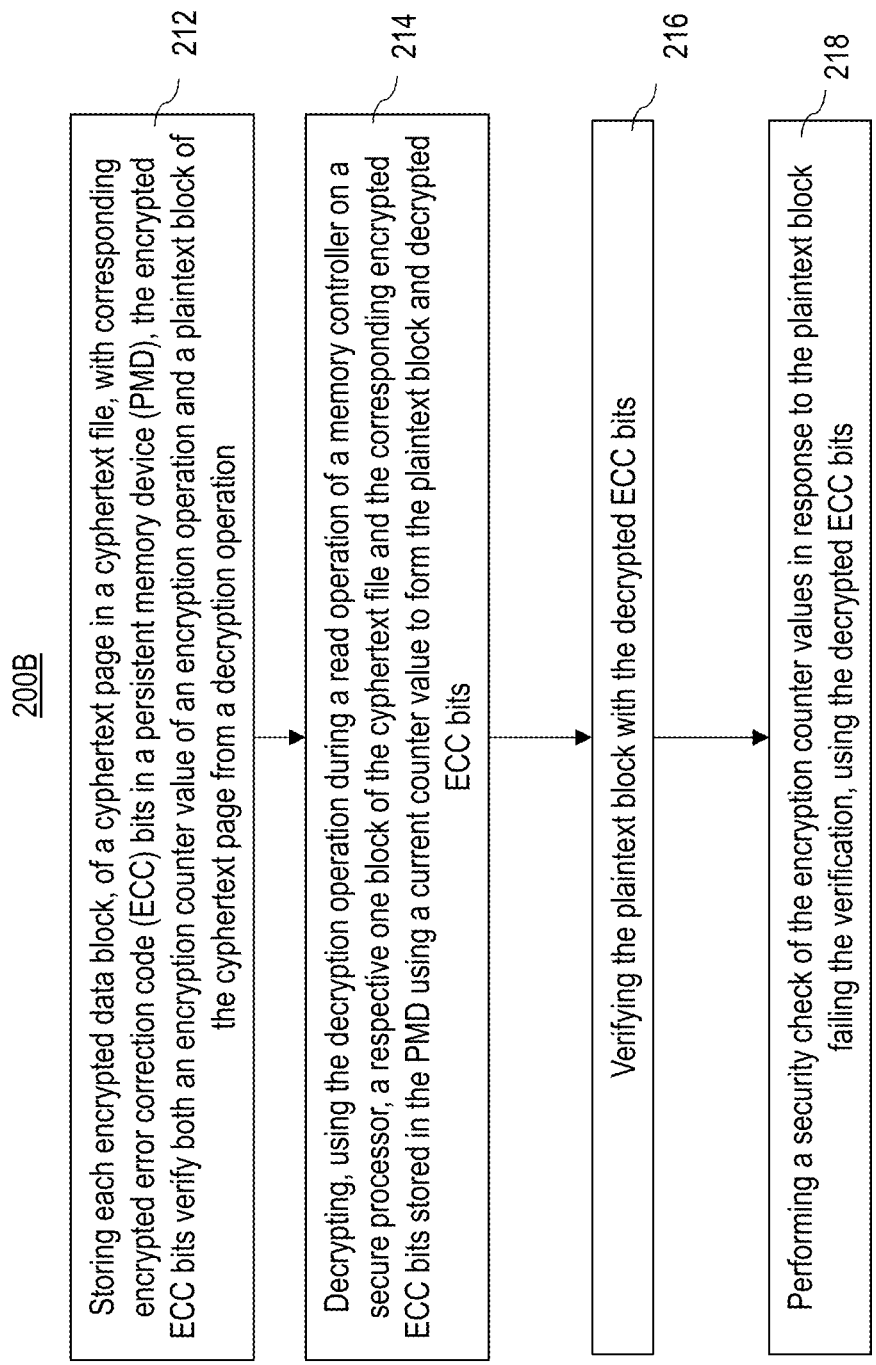
FIG. 2B illustrates a flowchart of a method for managing decryption and counter values with error correction codes (ECC) for a secure persistent memory when processing plaintext blocks of a page, according to some embodiments.

FIG. 2B illustrates a flowchart of a method 200B for managing decryption and counter values with error correction codes (ECC) for a secure persistent memory when processing plaintext blocks of a page, according to some embodiments. The method 200B may comprise, at block 212A, storing each encrypted data block, of a cyphertext page in a cyphertext file, with corresponding encrypted error correction code (ECC) bits in a persistent memory device (PMD). The encrypted ECC bits verify both an encryption counter value of an encryption operation and a plaintext block of the cyphertext page from a decryption operation.

The method 200B may include, at block 214, decrypting, using the decryption operation during a read operation of a memory controller on a secure processor, a respective one block of the cyphertext file and the corresponding encrypted ECC bits stored in the PMD using a current counter value to form the plaintext block and decrypted ECC bits.

The method 200B may include, at block 216, verifying the plaintext block with the decrypted ECC bits. The method 200B may include, at block 218, performing a security check of the encryption counter values in response to the plaintext block failing the verification, using the decrypted ECC bits.

Figure 3:
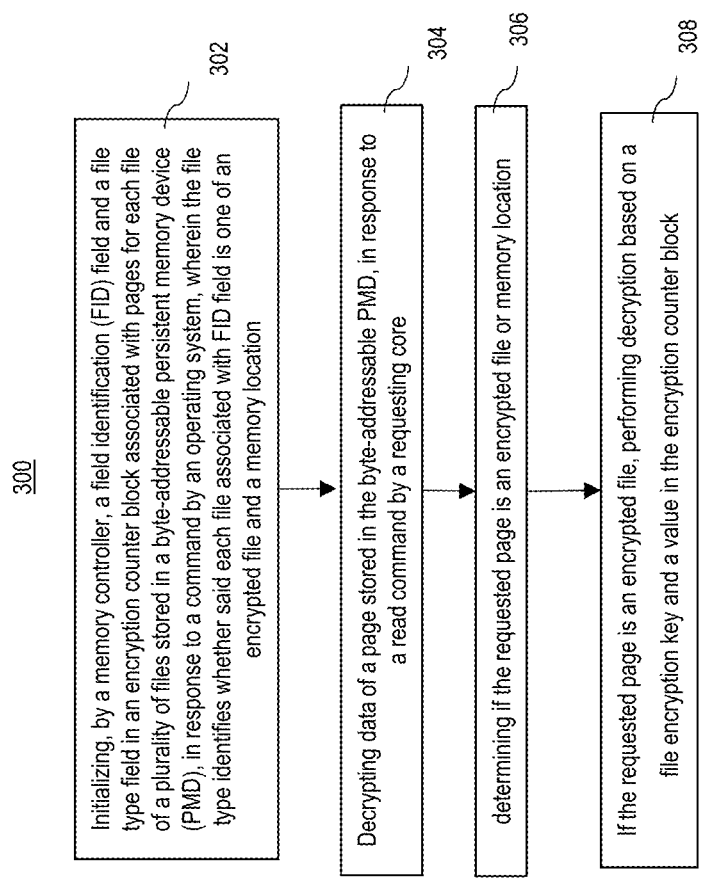
FIG. 3 illustrates a flowchart of a method for managing filesystem and memory decryption for pages stored in a secure byte-addressable persistent memory, according to some embodiments.

FIG. 3 illustrates a flowchart of a method 300 for managing filesystem and memory decryption for pages stored in a secure persistent memory device, according to some embodiments. While direct access to file (DAX) filesystems strive to allow the software applications to directly access files, most filesystem encryption implementations have been implemented with the assumption that accesses will be visible to system software and decryption can happen at the time of copying file pages to the page cache. Unfortunately, making DAX filesystem accesses visible to software defies the purpose of the DAX support. Accordingly, the inventors provide DAX-based filesystems paired with encrypted persistent memory with the ability to do encryption/decryption without sacrificing the direct and OS-transparent access capabilities of the encrypted memory devices.

The method 300 may comprise, at block 302, initializing, by a memory controller, a field identification (FID) field and a file type field in an encryption counter block associated with pages for each file of a plurality of files stored in a persistent memory device (PMD) 150A, in response to a command by an operating system (OS). The file type identifies whether said each file associated with FID field is one of an encrypted file and a memory location. If the file corresponds to a memory location, it is not necessary to query the OTT 112 for a file encryption key, for example.

The method 300 may include, at block 304, decrypting data of a page stored in the PMD, in response to a read command by a requesting core. The processor 101A may be a multi-core processor. The decryption operation may comprise, at block 306, determining if the requested page is an encrypted file or memory location. The method 300 may include, at block 308, if the requested page is an encrypted file, performing decryption based on a file encryption key and a value in the encryption counter block. By way of non-limiting example, the decryption may include performing a first bitwise modular addition of the data of the pages in the encrypted file based on a unique memory encryption/decryption pad generated by a processor encryption key and, subsequently, a second bitwise modular addition of a result of the first bitwise modular addition using a unique file encryption/decryption pad generated by a designated file encryption key associated with the requested file. The encryption and decryption operations may be symmetrical but generally, in reverse of the other.

The method 300 may include tracking, in a current process table (CPT) 114, for each core of a plurality of cores, a current process identification (PID) by corresponding core identification (CID). Additionally, the method 300 may include tracking in an open tunnel table (OTT) 112, for each current PID, an associated FID and file encryption key (FEK). Each PID may open and be associated with a plurality of files. However, these corresponding files may not all be encrypted. However, each encrypted file may have its own file encryption key which may be set by a user, administrator or other means. The OTT 112 allows file encryption keys to be tracked and subsequently changed.

Although blocks/steps are depicted in FIG. 3, as integral blocks/steps in a particular order for purposes of illustration, in other embodiments, one or more blocks/steps, or portions thereof, are performed in a different order, or overlapping in time, in series or in parallel, or are omitted, or one or more additional blocks/steps are added, or the method is changed in some combination of ways. Furthermore, managing counter-mode encryption/decryption of secure persistent memory devices may employ both methods of FIGS. 2 and 3 and variations thereof, wherein FIG. 2A-2B serves to recover counter values such as after a system crash or cyberattack.

Figure 4:
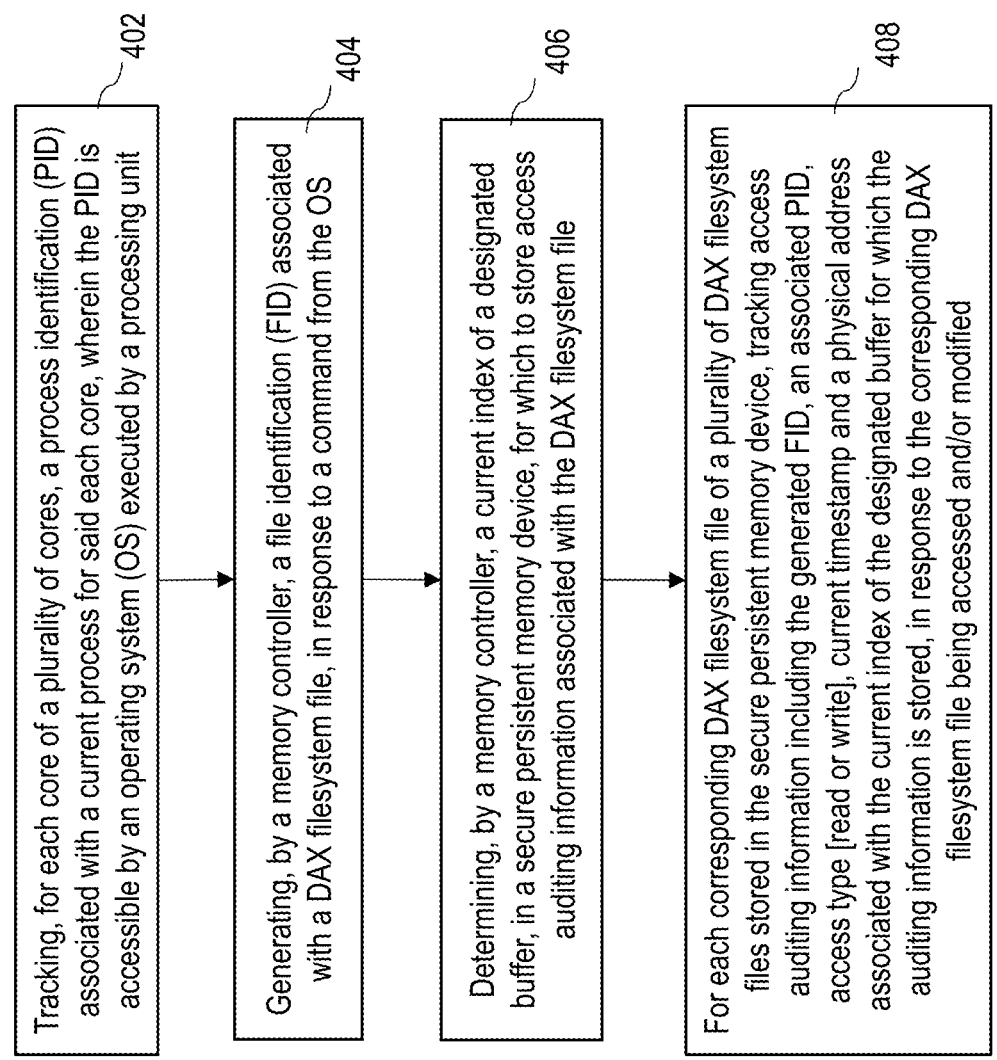
FIG. 4 illustrates a flowchart of a method for managing auditing of files in a secure byte-addressable persistent memory, according to some embodiments.

FIG. 4 illustrates a flowchart of a method 400 for managing auditing of files in a secure persistent memory, according to some embodiments. Similar issues of DAX filesystems mentioned above arise for enabling filesystem auditing. File auditing applications, that track the accesses to files, have been implemented with the assumption that all transactions are visible to software. While the ability to audit file accesses of a DAX filesystem is necessary for security and forensics, it can no longer be available in DAX-based filesystems in encrypted persistent memory devices without hardware support.

Filesystem auditing is a key enabler for improved investigative process visibility, performance optimizations and malware/virus detection. Unfortunately, giving the applications the ability to access files directly through typical memory load/store operations makes implementing filesystem auditing more challenging as most filesystem accesses are no longer visible to OS or system software. Thus, file auditing with or without the need for filesystem encryption/decryption has not been feasible except through impractically interrupting application on each file operation. Accordingly, the inventors provide a DAX filesystem paired with encrypted (secure) persistent memory devices with the ability to perform auditing without sacrificing the direct and OS-transparent access capabilities.

A method 400 may comprise, at block 402, tracking, for each core of a plurality of cores, a process identification (PID) associated with a current process for said each core. The PID is accessible by an operating system (OS) executed by a processing unit. The method may comprise, at block 404, generating, by a memory controller 125A, a file identification (FID) associated with a DAX filesystem file in response to a command from the OS 142. The method 400 may comprise, at block 406, determining, by a memory controller 125A, a current index of a designated buffer, in an encrypted persistent memory device, for which to store file-access auditing information associated with the DAX filesystem file. For each corresponding DAX filesystem file of a plurality of DAX filesystem files stored in the encrypted (secure) persistent memory device (i.e., persistent memory device 150A), the method 400 may include, at block 408, tracking the file-access auditing information including one or more of the generated FID, an associated PID, access type, current timestamp and a physical address associated with the current index of the designated buffer for which the file-access auditing information is stored, in response to the corresponding DAX filesystem file being accessed and/or modified.

Generally, a plurality of ways may be used to implement filesystem history buffers for file auditing. In one example, a global auditing region may be designated in the memory controller 125A that basically tracks accesses of the DAX filesystem files. This approach is simplistic and requires minimal changes at the OS 142 and memory controller levels. In another example, a per-file auditing region may be used to hold the transactions history of the corresponding DAX filesystem file in the auditing memory array 156 of the encrypted persistent memory device 150A. The auditing implementations are suitable for both encrypted and non-encrypted DAX filesystem files stored in encrypted (secure) persistent memory devices. Furthermore, the auditing implements may incorporate the OTT 112 and CPT 114 described above in relation to FIGS. 1A and 3 for capturing the auditing information. In other implementations, metadata may be generated in lieu of using the information of the OTT 112 and CPT 114.

Although blocks/steps are depicted in FIG. 4, as integral blocks/steps in a particular order for purposes of illustration, in other embodiments, one or more blocks/steps, or portions thereof, are performed in a different order, or overlapping in time, in series or in parallel, or are omitted, or one or more additional blocks/steps are added, or the method is changed in some combination of ways. Furthermore, managing counter-mode encryption/decryption of secure persistent memory devices may employ both methods of FIGS. 2 and 4 and variations thereof, wherein FIG. 2A-2B serves to recover counter values such as after a system crash or cyberattack. Alternately, managing counter-mode encryption/decryption of secure persistent memory devices may employ both methods of FIGS. 3 and 4 and variations thereof, wherein FIG. 3 serves to manage counter-mode encryption of DAX filesystem files. Still further, managing counter-mode encryption/decryption of secure persistent memory devices may employ the methods of FIGS. 2-4 and variations thereof.

Emerging Non-Volatile Memories (NVMs) are a promising advancement in memory and storage systems. For the first time in the modern computing era, memory and storage systems have the opportunity to converge into a single system. With latencies close to those of dynamic random access memory (DRAM) and the ability to retain data during power loss events, NVMs represent the perfect building block for novel architectures that have files stored in media that can be accessed similar to conventional access of the memory system (i.e., through conventional load/store operations). Furthermore, given the near-zero idle power of emerging NVMs, they can bring significant power savings by eliminating the need for the frequent refresh operations needed for DRAM. NVMs also promise large capacities and much better scalability compared to DRAM [1], [2], which means more options for running workloads with large memory footprints.

While NVMs are certainly promising, they still face some challenges that can limit their wide adoption. One major challenge is the limited number of writes that NVMs can endure; most promising technologies, e.g., Phase-Change Memory (PCM), can generally endure tens of millions of writes for each cell [3], [4]. They also face security challenges NVMs can facilitate data remanence attacks [4], [6]. To address such vulnerabilities, processor vendors, e.g., INTEL and AMD, have started to support memory encryption. Unfortunately, memory encryption exacerbates the write endurance problem due to its avalanche effect [4], [6]. Thus, it is very important to reduce the number of writes in the presence of encryption. In fact, it is observed that a significant number of writes can occur due to persisting encryption metadata. For security and performance reasons, counter-mode encryption has been used for state-of-the-art memory encryption schemes [4], [6]-[9]. For counter-mode encryption, encryption counters/IVs are needed, and they are typically organized and grouped to fit in cache blocks, e.g., Split-Counter scheme (64 counters in 64B block) [10] and SGX (8 counters in 64B block) [7]. One major reason behind that is, for cache fill and eviction operations, most DDR memory systems process read/write requests on a 64B block granularity, e.g., DDR4 8n-prefetch mode. Moreover, packing multiple counters in a single cache line can exploit spatial locality to increase counter cache hit rate.

Most prior research work has assumed that systems have sufficient residual or backup power to flush encryption metadata (i.e., encryption counters) in the event of power loss [4], [9]. Although feasible in theory, in practice, reasonably long-lasting Uninterruptible Power-Supplies (UPS) are expensive and occupy large areas. Admittedly, the Asynchronous DRAM Refresh (ADR) feature has been a requirement for many NVM form factors, e.g., NVDIMM [11], but major processor vendors generally only limit persistent domains in processors to tens of entries in the write pending queue (WPQ) in the memory controller [12]. NV-DIMM means non-volatile dual in-line memory module, which uses non-volatile memory chip as their random access memory.

The main reason behind this is the high cost for guaranteeing a long-lasting sustainable power supply in case of power loss coupled with the significant power needed for writing to some NVM memories. However, since encryption metadata can be on the order of kilobytes or even megabytes, the system-level ADR feature would most likely fail to guarantee its persistence as a whole. In many real-life scenarios, affording sufficient battery backup or expensive power-supplies is infeasible, either due to area, environmental or cost limitations. Therefore, battery-free solutions are always in demand.

Persisting encryption counters is not only critical for system restoration but is also a security requirement. Reusing encryption counters (i.e., those not persisted during a crash) can result in meaningless data after decryption. Even worse, losing the most-recent counters invites a variety of attacks that rely on reusing encryption pads (counter-mode encryption security strictly depends on the uniqueness of encryption counters used for each encryption). Recent work [13] has proposed atomic persistence of encryption counters, in addition to exploiting application-level persistence requirements to relax atomicity. Unfortunately, exposing application semantics (persistent data) to hardware requires application modifications. Moreover, if applications have a large percentage of persistency-required data, persisting encryption metadata will incur a significant number of extra writes to NVM. Finally, the selective counter persistence scheme can cause encryption pad reuse for non-persistent memory locations, if a state-of-the-art split counter is used, which enables known-plaintext attackers to observe the lost/new encryption pads that will be reused when the stale counters are incremented after crash recovery. Note that such reuse can happen for different users or applications.

The embodiments herein provide a lightweight solution, motivated by a discussion of the problem of persisting NVM encryption counters, and discuss the different design options for persisting encryption counters. In contrast with prior work, the embodiments herein do not require any software modifications and can be orthogonally augmented with prior work [13]. Furthermore, at least one embodiment herein chooses to provide consistency guarantees for all memory blocks rather than limit these guarantees to a subset of memory blocks, e.g., persistent data structures. To this end, the encryption counter security check (ECSC) scheme, sometimes referred to as the "Osiris" scheme repurposes Error-Correction Code (ECC) bits of the data to provide a sanity-check for the encryption counter used to perform the decryption function. By doing so, Osiris can reason about the correct encryption counter even in the event that the most-recent value is lost. Thus, it can relax the strict atomic persistence requirement while providing secure and fast recovery of lost encryption counters. The impact on write-endurance and performance of the embodiments are evaluated. To evaluate the embodiments, Gem5 may be used to run a selection of eight memory-intensive workloads pulled from SPEC2006 and U.S. Department of Energy (DoE) proxy applications. Compared to a write-through counter-cache scheme, on average, ECSC or Osiris scheme can reduce 48.7% of the memory writes (increase lifetime by 1.95×) and reduce the performance overhead from 51.5% (for write-through) to approximately 5.8%. Furthermore, without the need for backup battery or extra power-supply hold-up time, the ECSC or Osiris scheme performs better than a battery-backed Write-Back (5.8% vs. 6.6% overhead) and has less write-traffic (2.6% vs. 5.9% overhead).

The embodiments provide an ECSC or Osiris scheme that provides crash consistency for encryption counters similar to strict counter persistence schemes but with a significant reduction in performance overhead and number of NVM writes, without the need for an external/internal backup battery. Its optimized version Osiris-Plus, further reduces the number of writes by eliminating premature counter evictions from the counter cache. Several design options for Osiris are discussed that provide trade-offs between hardware complexity and performance. As will be seen from the description below, the Osiris scheme is configured to work with and be integrated with state-of-the-art data and counter integrity verification schemes.

NVM Background and Motivation

Emerging NVMs and state-of-the-art memory encryption implementations will now be described.
Emerging NVMs Emerging NVM technologies, such as Phase-Change Memory (PCM) and Memristor, are promising candidates to be the main building blocks of future memory systems. Vendors are already commercializing these technologies due to their many benefits. NVMs' read latencies are comparable to DRAM while promising high densities and potential for scaling better than DRAM. Furthermore, they enable persistent applications. On the other hand, emerging NVMs have limited, slow and power consuming writes. NVMs also have limited write endurance. For example, PCM's write endurance is between 10-100 million writes [3]. Moreover, emerging NVMs suffer from a serious security vulnerability: they keep their content even when the system is powered off. Accordingly, NVM devices are often paired with memory encryption.
Memory Encryption and Data Integrity Verification There are different encryption modes that can be used to encrypt the main memory. The first one is the direct encryption (a.k.a. ECB mode), where an encryption algorithm, such as Advanced Encryption Standard (AES) or Data Encryption Standard (DES), is used to encrypt each cache block when it is written back to memory and decrypt it when it enters the processor chip again. The main drawback of direct encryption is system performance degradation due to adding the encryption latency to the memory access latency (the encryption algorithm takes the memory data as its input). The second mode, which is commonly used in secure processors, is counter mode encryption.

Figure 7:
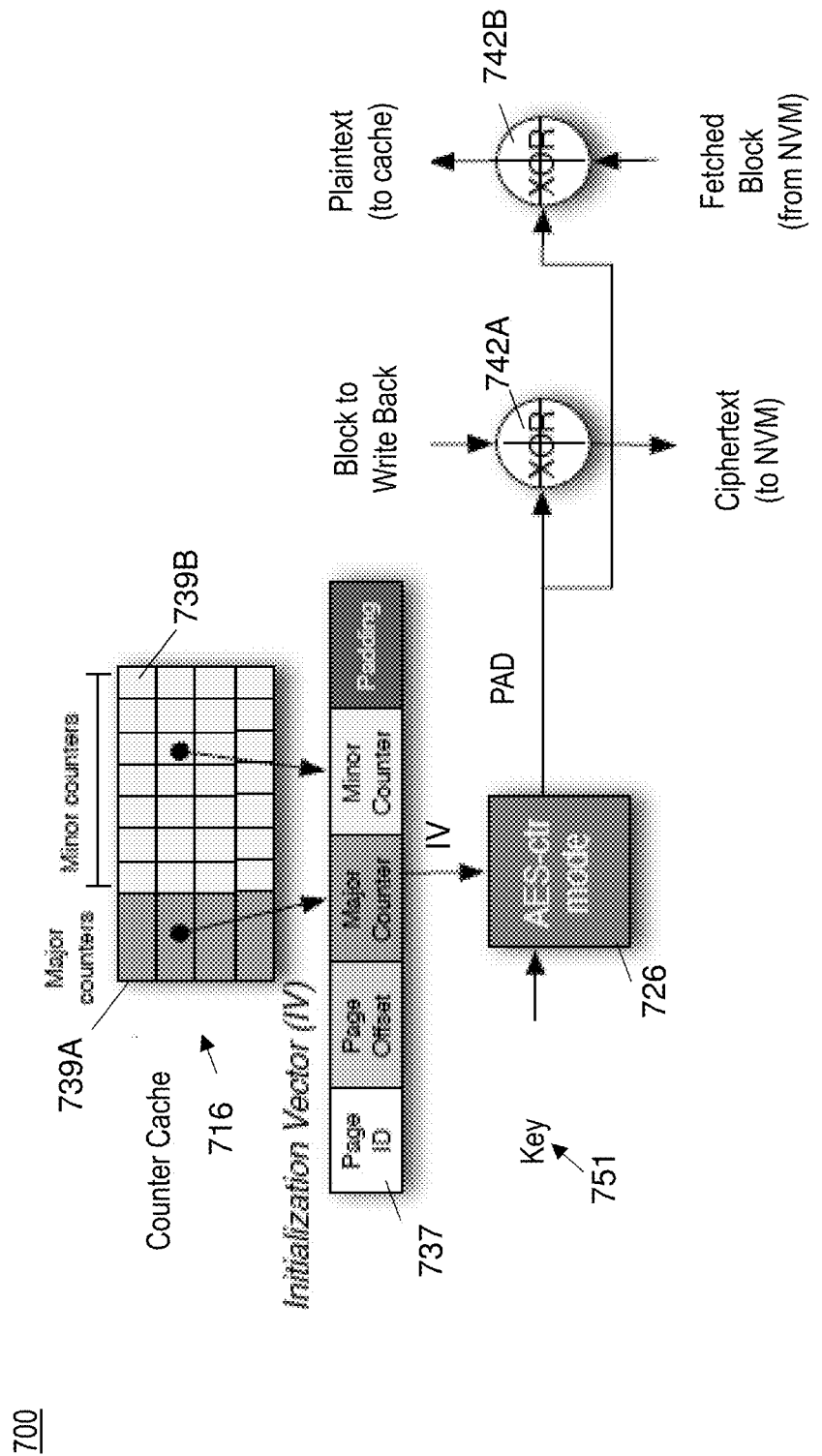
FIG. 7 illustrates a prior art flow diagram of memory encryption using a counter mode.

FIG. 7 illustrates a prior art flow diagram 700 of memory encryption using a counter mode. In counter-mode encryption, the encryption algorithm (AES or DES) uses an initialization vector (IV) having an IV format 737, as its input to the AES engine 726 to generate a one-time pad (OTP) as depicted in FIG. 7. The AES engine 726 receives a key 751 for use in encrypting and generating the one-time pad. Once the data arrives, a simple bitwise XOR either 742A or 742B with the pad is needed to complete the decryption. Thus, the decryption latency is overlapped with the memory access latency. In state-of-the-art designs [4], [10], each IV consists of a unique ID of a page (to distinguish between swap space and main memory space), page offset (to guarantee different blocks in a page will get different IVs), a per-block minor counter (to make the same value encrypted differently when written again to the same address), and a per-page major counter (to guarantee uniqueness of IV when minor counters overflow). Bitwise XOR 742A provides XORing with the OTP (i.e., pad) and the block to write back to create ciphertext to the NVM. Bitwise XOR 742B provides XORing with the OTP (i.e., pad) and fetched Block from NVM to generate the plaintext to counter cache 716.

Similar to prior work [4], [6], [10], [13], [14], counter mode processor-side encryption is assumed. In addition to hiding the encryption latency when used for memory encryption, it also provides strong security defenses against a wide range of attacks. Specifically, counter-mode encryption prevents snooping attacks, dictionary-based attacks, known-plaintext attacks and replay attacks. Typically, the encryption counters are organized as major counters 739A, shared between cache blocks of the same page, and minor counters 739B that are specific for each cache block [10]. This organization of counters can fit 64 cache blocks' counters in a 64B block, 7-bit minor counters and a 64-bit major counter. The major counter 739A is generally only incremented when one of its relevant minor counter's overflows, in which the minor counters will be reset and the whole page will be re-encrypted using the new major counter for building the IV of each cache block of the page [10]. When the major counter of a page overflows (64-bit counter), the key is changed and the whole memory will be re-encrypted with the new key. This scheme provides a significant reduction of the re-encryption rate and minimizes the storage overhead of encryption counters when compared to other schemes such as a monolithic counter scheme or using independent counters for each cache block. Additionally, a split-counter scheme allows for better exploitation of spatial locality of encryption counters, achieving a higher counter cache hit rate. Similar to state-of-the-art work [4], [8]-[10], a split-counter scheme may be used to organize the encryption counters.

Data integrity is typically verified through a Merkle Tree—a tree of hash values with the root maintained in a secure region. However, encryption counter integrity must also be maintained. As such, state-of-the-art designs combine both data integrity and encryption counter integrity using a single Merkle Tree (Bonsai Merkle Tree [14]).

Figure 8:
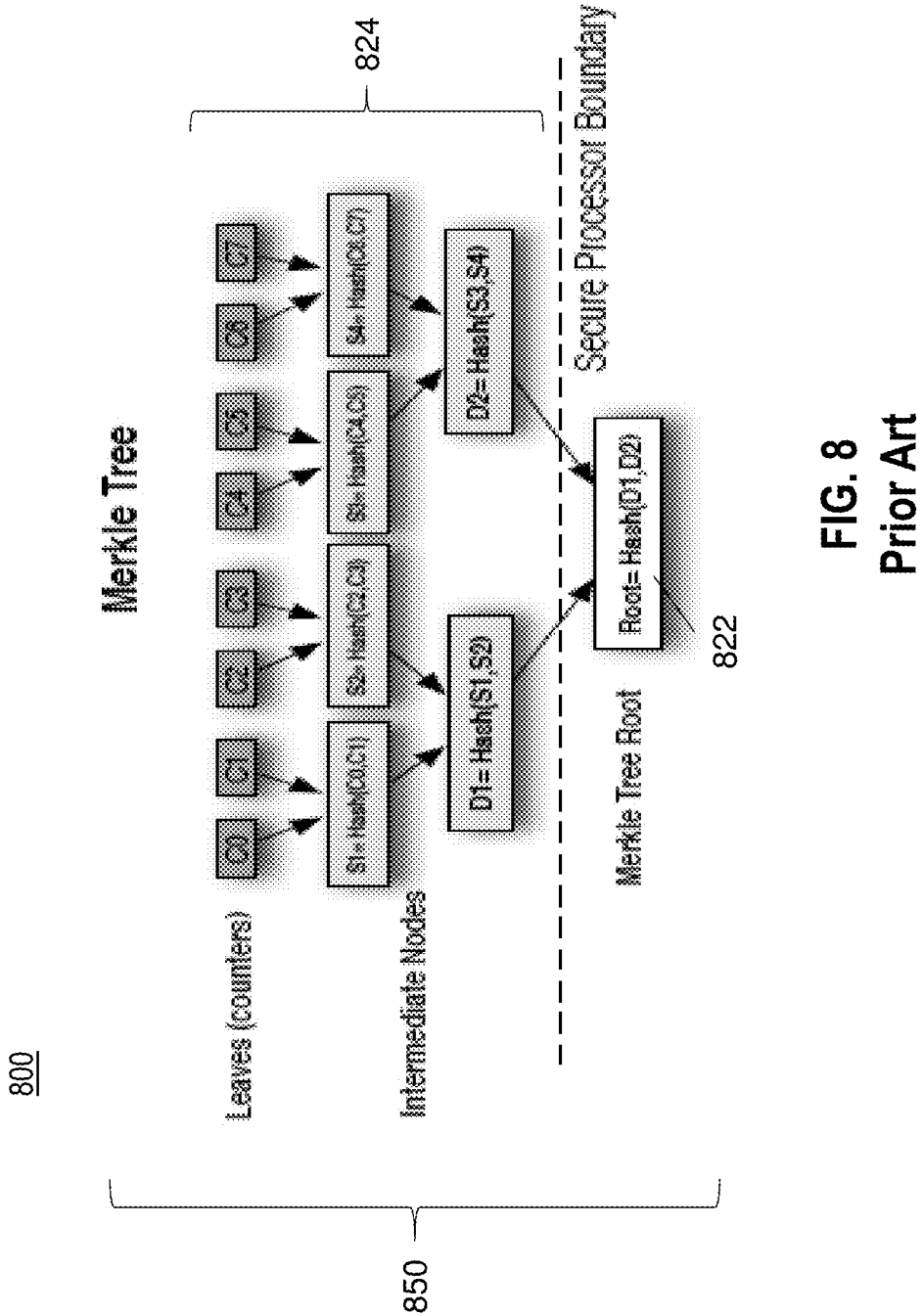
FIG. 8 illustrates a prior art flow diagram of an example (prior art) Merkle Tree for integrity verification.

FIG. 8 illustrates a flow diagram 800 of an example (prior art) Merkle Tree 850 for integrity verification. As shown in FIG. 8, Bonsai Merkle tree 850 is built around the encryption counters. Data blocks are protected by a media access control (MAC) value that is calculated over the counter and the data itself. Note that generally only the root 822 of the tree needs to be kept in the secure region, other parts of the Merkle Tree 850 are cached on-chip to improve performance. For some of the embodiments, assume a Bonsai Merkle Tree configuration. The Merkle Tree 850 includes counter $C_0$-$C_7$, for example, which can be stored in the Merkle Tree cache. An example, Merkle Tree 850 includes intermediate nodes $S_1$-$S_4$ with a hash tree configuration. For example, $S_1$ is a hash of $C_0$ and $C_1$; $S_2$ is a hash of $C_2$ and $C_3$; $S_3$ is a hash of $C_4$ and $C_5$; and $S_4$ is a hash of $C_6$ and $C_7$. Then, intermediate node $D_1$ is a hash of $S_1$ and $S_2$. Intermediate node $D_2$ is a hash of $S_3$ and $S_4$.

Finally, in this example, the Merkle Tree root may be a hash of intermediate nodes $D_1$ and $D_2$.

Encryption Metadata Crash Consistency

Figure 9:
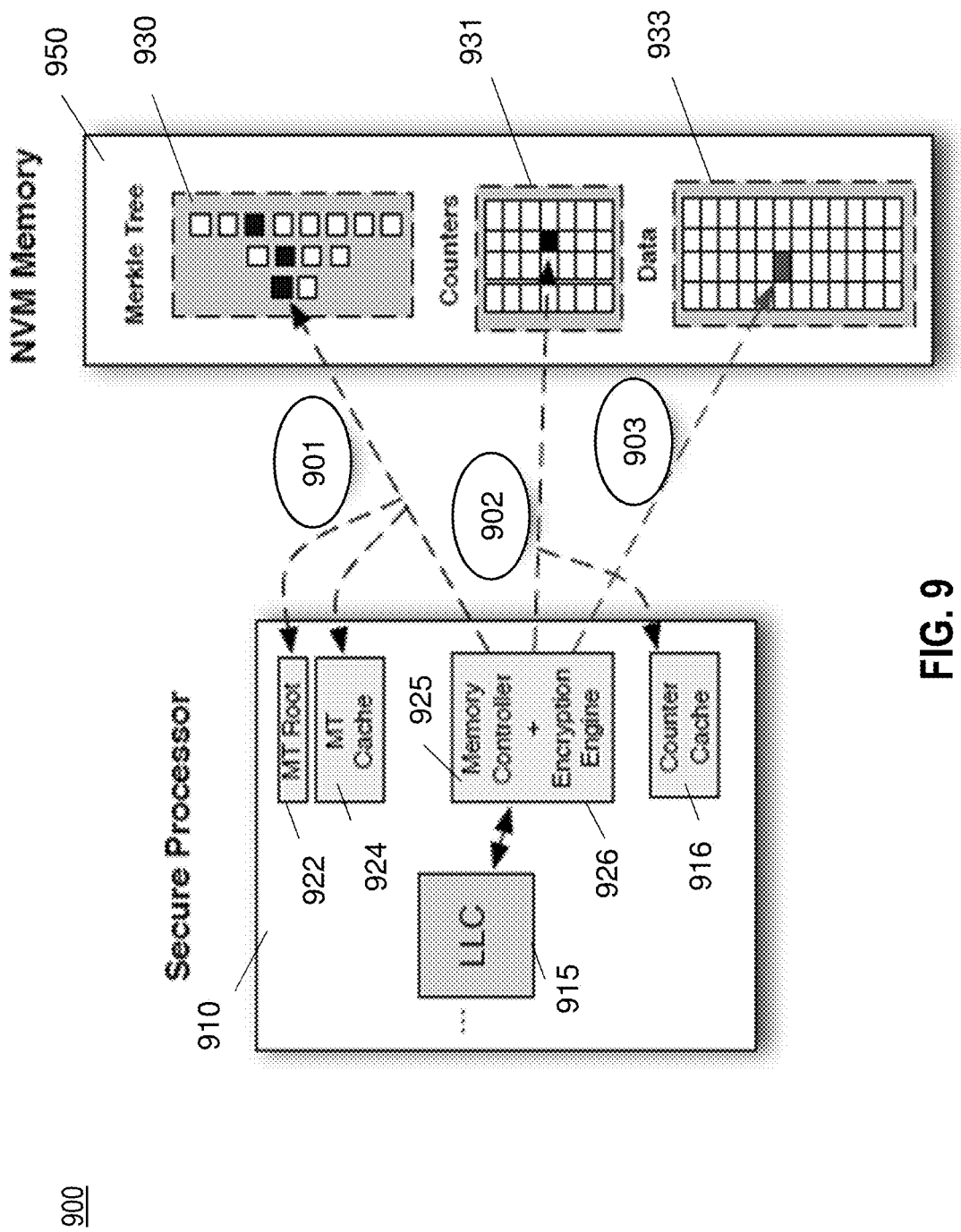
FIG. 9 illustrates a flow diagram including steps for write operations to ensure crash consistency.

While crash consistency of encryption metadata has been overlooked in most memory encryption work, it becomes essential in persistent memory systems. If a crash happens, the system is expected to recover and restore its encrypted memory data. FIG. 9 depicts the steps needed to ensure crash consistency.

FIG. 9 illustrates a flow diagram of a system 900 including steps for write operations to ensure crash consistency. As shown in the FIG. 9, when there is a write operation to NVM memory 950, first update the root 922 of the Merkle Tree 930 (as shown in step 901) and any cached intermediate nodes of the Merkle Tree cache 924 inside the secure processor 910. Note that generally only the root 922 of the Merkle Tree 930 needs to be kept in the secure region. In fact, maintaining intermediate nodes of the Merkle Tree 930 can speed up the integrity verification. Persisting updates of intermediate nodes into memory is optional as it is feasible to reconstruct them from leaf nodes (counters) and then generate the root 922 and verify it through comparison with that kept inside the processor 910. It is stressed that the root 922 of the Merkle Tree 930 must persist safely across system failures, e.g., through internal processor NVM registers. Persisting updates to intermediate nodes of the Merkle Tree 930 after each access might speed up recovery time by reducing the time of rebuilding the whole Merkle Tree 930 after crash. However, the overheads of such a scheme and the infrequency of crashes make rebuilding the tree a more reasonable option.

In step 902 of FIG. 9, the updated counter block 931 will be written back to the NVM memory 950 as it gets updated in the counter cache 916. Unlike Merkle Tree intermediate nodes, counters are critical to keep and persist, otherwise the security of the counter-mode encryption is compromised. Moreover, losing the counter values can result in the inability to restore encrypted memory data. As noted by Liu et al. [13], it is possible to just persist the counters of persistent data structures (or a subset of them) to enable consistent recovery. However, this is not sufficient from a security point of view; losing counters' values, even for non-persistent memory locations, can cause reuse of an encryption counter with the same key, which can compromise the security of the counter-mode encryption. Furthermore, legacy applications may rely on operating system (OS) level or periodic application-oblivious checkpointing, making it challenging to expose their persistent ranges to the memory controller 925. Accordingly, a secure scheme that persists counter updates is needed and may require little software alteration. Note that even for non-persistent applications, counters must be persisted on each update or the encryption key must be changed, and all of the memory must be re-encrypted by the encryption engine 926 with a new key. Moreover, if the persistent region in NVM memory 950 is large, which is likely in future NVM-based systems, most memory writes will be accompanied by an operation to persist the corresponding encryption counters, making step 902 a common event. It should be noted that the encryption engine 926 may also perform decryption and thus would function as an encryption/decryption engine.

Finally, the written block of data 933 will be sent to the NVM memory 950 as shown in step 903. Some portions of step 901 and step 902 are crucial for correct and secure restoration of secure NVMs. Also note that when updating the root 922 of the Merkle Tree 930 on the chip, updating the counter 931 and writing the data are assumed to happen atomically, either using three internal NVM registers to save them before trying to update them persistently or using hold-up power that is sufficient to complete three writes. To avoid incurring the high latency to update NVM registers for each memory write, a hybrid approach can be used where three volatile registers can be backed with hold-up power to write them to the slower NVM registers inside processor. Ensuring write atomicity is beyond the scope of the embodiments herein; the focus is to avoid frequent persistence of updates to counter values in memory and using the fast-volatile counter cache while ensuring safe and secure recoverability.

Motivation

As mentioned earlier, counter blocks must be persisted to allow safe and secure recovery of the encrypted memory. Also, the Merkle Tree root cannot be written to NVM and must be saved in the secure processor. The intermediate nodes of the tree can be reconstructed after recovery from a crash, hence there is no need to persist updates to the affected nodes after each write operation. In other words, no extra work should be done to the tree beyond what occurs in conventional secure processors without persistent memory. As the performance overhead of Bonsai Merkle Tree integrity verification is negligible (less than 2% [14]), the focus of the embodiments herein is to reduce the overhead of persisting encryption counters. To persist the encryption counters, two methods are employed: Write-Through Counter Cache (WT) and Battery-Backed Write-Back Counter Cache (WB). In the WT approach, whenever there is a write operation issued to NVM, the corresponding counter block is updated in the counter cache and persisted in NVM before the data blocks are encrypted and updated in NVM to complete the write operation. However, the WT approach causes significant write-traffic and will severely degrade performance. In the WB approach, the updated counter block is marked as dirty in the counter cache and is only written back to NVM when it is evicted. The main issue with the WB counter-cache is that it requires a sufficient and reliable power source after a crash to enable flushing the counter-cache contents to NVM, which increases the system cost and typically requires a large area. Most processor vendors, e.g., INTEL, define the in-processor persistent domain to only include the write-pending queue (WPQ) in the memory controller. Note that using UPS to hold-up the system until backing up important data is a common practice in critical systems. However, commodity or low-power processors to shoulder the costs and area requirements of UPS systems are not expected.

Figure 10:
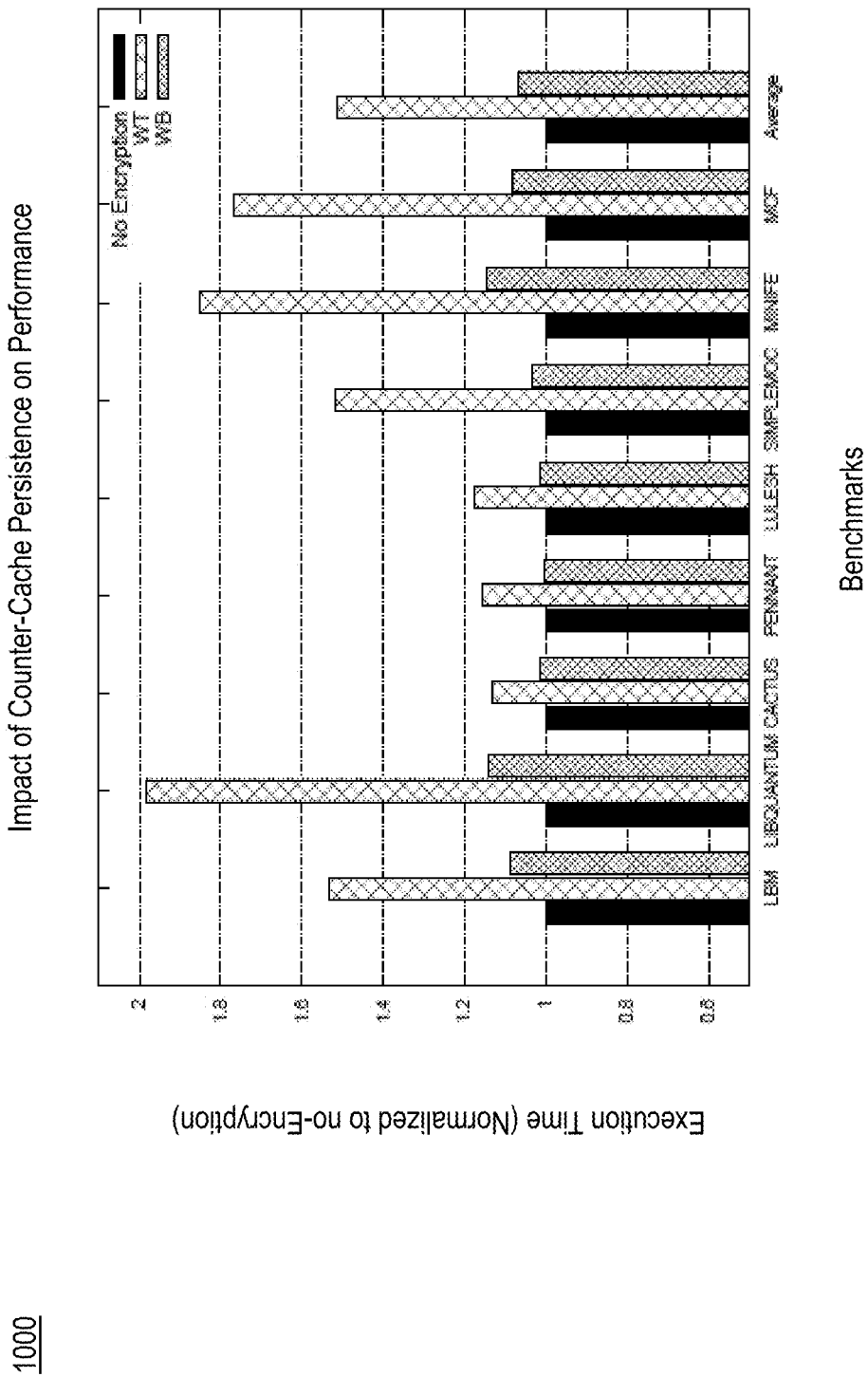
FIG. 10 illustrates a graphical representation of a counter-cache persistence on performance.

FIG. 10 illustrates a graphical representation 1000 of a counter-cache persistence on performance. As shown in FIG. 10, WT counter-cache, denoted in a large cross-hatching pattern, entails significant performance degradation for most of the benchmarks compared to no-encryption, denoted in a solid black bar, and WB counter-cache schemes, denoted in a small cross-hatching pattern. On average, WT scheme degrades performance by approximately 51.5% whereas WB scheme only degrades performance by approximately 6.6% compared to a no-encryption (unprotected) scheme. In applications that are write-intensive, e.g., Libquantum benchmark, the performance overhead of WT can reach approximately 198% normalized to that of the no-encryption scheme. The benchmarks include LBM (SPEC2006 suite [25]), LIB QUANTUM (SPEC2006 suite [25]), CACTUS (SPEC2006 suite [25]), PENNANT (DoE) [26], LULESH (DoE) [26], SIMPLEMOC (DoE) [26], MINIFE (DoE) [26], MCF (SPEC2006 suite [25]) and Average. LULESH stands for Livermore Unstructured Lagrangian Explicit Shock Hydrodynamics. In MINIFE, FE is a Finite Element mini-application (MINI) which implements a couple of kernels representative of implicit finite-element applications. PENNANT is a hydrodynamics mini-app which operates on two-dimensional (2-D) unstructured finite element meshes containing arbitrary polygons. SimpleMOC is a "mini-app" which mimics the computational performance of a full three dimensional (3D) method of characteristics (MOC) solver without involving the full physics perspective.

Another key metric relevant to NVM memory is the write traffic. NVM memories have limited write bandwidth due to the limited write-drivers and the large power-consumption for each write operation. More critically, NVM memories have limited endurance for writes. In WT scheme, besides data block write, each write operation requires an additional in-memory persistence of the counter value, thus incurs twice the write traffic of the no-encryption scheme. In contrast, the WB scheme only writes the updated counter blocks to the NVM memory when blocks are evicted from the counter cache.

Figure 11:
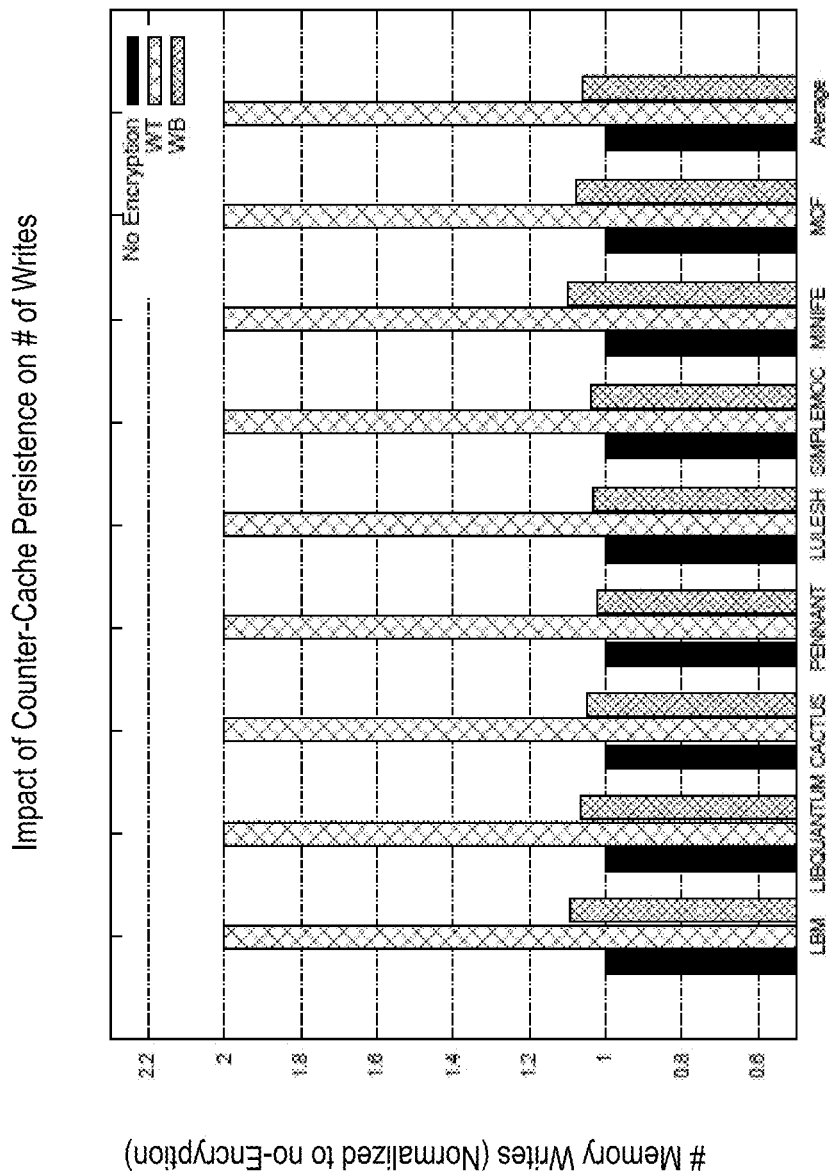
FIG. 11 illustrates a graphical representation of an impact of counter-cache persistence on the number of writes.

FIG. 11 illustrates a graphical representation 1100 of an impact of counter-cache persistence on the number of writes. As shown in FIG. 11, WB, denoted in a small cross-hatching pattern, incurs an extra 5.92% writes on average when compared to the no-encryption scheme, whereas WT, denoted in a large cross-hatching pattern, as expected, incurs twice the write traffic.

Note that the atomicity of the WT scheme includes both data write and counter write. Crashes (or power loss) can happen between transactions or in the middle of a transaction. There are several simple ways to guarantee atomicity. The first way is placing a small NVM storage (e.g., 128B) inside the processor chip to log both the to-be-written data block and counter block before trying to commit them to memory. If a failure occurs, once the system restores, it begins with redoing the stored transactions. The second way is guaranteeing enough power hold-up time (through reasonable small capacitors) to complete at least 2 write operations (data and counter). However, solutions that aim to guarantee memory transaction-level atomicity are beyond the scope of the embodiments described herein.

The embodiments include a new scheme that has the advantages of the WT scheme—no need for a battery or long power hold-up time. It also has as small performance and write traffic overheads such as those of the WB scheme.

Osiris

Threat Model

For the sake of discussion, a threat model is assumed such as one similar to state-of-the-art work on secure processors [4], [6], [8]. The trust base includes the processor and all of its internal structures. The threat model assumes that an attacker can snoop the memory bus, scan the memory content, tamper with the memory content (including rowhammer) and replay old packets. Differential power attacks and electromagnetic inference attacks are beyond the scope of the embodiments described herein. Furthermore, attacks that try to exploit processor bugs in speculative execution, such as Meltdown and Spectre, are beyond the scope of the embodiments described herein. Such attacks can be mitigated through more aggressive memory fencing around critical code to prevent speculative execution. Finally, the proposed solution does not preclude secure enclaves and hence can operate in untrusted Operating System (OS) environments.

Attack on Reusing Counter Values for Non-Persistent Data

While state-of-the-art [13] work relaxes persisting counters for non-persistent data, if using split counter like in [15], it actually introduces serious security vulnerabilities. For example, assume an attacker application uses known plaintext and writes it to memory. If the memory location is non-persistent, the encrypted data will be written to memory but not the counter. Thus, by observing the memory bus, the attacker can discover the encryption pad by XORing the observed ciphertext, ($E_{key}(IV_{new})$ $\oplus$ Plaintext), with the Plaintext wherein $E_{key}$ is the encryption key. Note that it is also easy to predict the plaintext for some accesses, for instance, zeroing at first access. By now, the attacker knows the value of $E_{key}(IV_{new})$. Later, after a crash, the memory controller will read $IV_{old}$ and increment it, which generates $IV_{new}$, and then encrypts the new application data written to that location to become $E_{key}(IV_{new})$ $\oplus$ Plaintext2. The attacker can discover the value of Plaintext2 by XORing the ciphertext with the previously observed $E_{key}(IV_{new})$. Note that the stale counter could have been already incremented multiple times before the crash; multiple writes of the new application can reuse counters with known encryption pads. Note that such an attack only needs a malicious application to run (or just predictable initial plaintext of an application) and a physical attacker or bus snooper.

Design Options

Before delving deep into the details of the ECSC or Osiris scheme, let's first discuss the challenges of securely recovering the encryption counters after a crash. Without a mechanism to persist encryption counters, once a crash occurs, you are only guaranteed that the root (kept in processor) of the Merkle Tree is updated and reflects the most recent counter values written to memory; any write operation before being sent to NVM will update the affected parts/branches of the Merkle Tree up to the root. Note that it is likely that the affected branches of the Merkle Tree will be cached on the processor and there is no need to persist them as long as the processor can maintain the value of the root after crash. Later, once the power is back and restoration of the system is needed, stale counter values may exist in the NVM and stale intermediate values of the Merkle Tree may exist.

Once the system is powered back, any access to a memory location needs two main steps: (1) obtain the corresponding most-recent encryption counter from memory and (2) verify the integrity of data through the MAC and the integrity of the used counter value through the Merkle Tree. It is possible that Step (1) results in a stale counter, in which case Step (2) will fail due to a Merkle Tree mismatch. Remember that the root of the Merkle Tree was updated before the crash, thus using a stale counter will be detected. As soon as the error is detected, the recovery process stops.

One naïve approach would be to try all possible counter values and use the Merkle Tree to verify each value. Unfortunately, such a brute-force approach is impractical for several reasons. First, finding out the actual value requires trying all possible values for a counter paired with calculating the corresponding hash values to verify integrity, which is impractical for typical encryption counter schemes where there could be $2^{64}$ possible values for each counter. Second, it is unlikely that only one counter value is stale; many updated counters in the counter cache will be lost. Thus, reconstructing the Merkle Tree will be impractical if there are multiple stale counters. For example, counters of blocks X and Y are lost, then reconstruct the Merkle Tree with all possible combinations/values of X and Y and then compare the resulting root with the one safely stored in processor. For simplicity, only losing two counters are mentioned; in a real system, where a counter cache is hundreds of kilobytes, there will likely be thousands of stale blocks.

Observation 1

Losing encryption counter values makes reconstructing the Merkle Tree nearly impossible. Approaches such as a brute-force trial of all possibly lost counter values to reconstruct the tree will take an impractical amount of time especially when multiple counter values have been lost.

One possible way to reduce reconstruction time is to employ stop-loss mechanisms that limit the number of possible counter values to verify for each counter after recovery. Unfortunately, since there is no way to pinpoint exactly which counters have lost their values, an aggressive search mechanism is still needed. If the number of writes is limited to each counter block before persisting it to only N, then try up to $N^S$ combinations for reconstruction where S is the number of data blocks. For instance, let's assume a 128 gigabytes (GB) of NVM memory and 64B cache blocks, then there are $2 \times 10^{30}$ blocks. If N is set only to 2, then up to $2^{2^{31}} = 2^{2147483648}$ trials are needed. Accordingly, a stop-loss mechanism could reduce the time to reconstruct the Merkle Tree. However, it is still impractical.

Obviously, a more explicit confirmation is needed before proceeding with an arbitrary counter value to reconstruct the Merkle Tree. In other words, a hint is needed on what the most recent counter value was for each counter block. For instance, if the previously discussed stop-loss mechanism is used along with an approach to bookkeep the phase within the N trials before writing the whole counter block, then start with a more educated guess. Specifically, each time to update a counter block N times in the counter-cache, one needs to persist its Nth update in the memory, which means that log 2N bits (i.e., phase) is needed for each counter block to be written atomically with the data block. Later, when the system starts recovery, it knows the exact difference between the most recent counter value and the one used to encrypt the data through the phase value.

Observation 2

Co-locating the data blocks with a few bits that reflect most-recent counter value used for encryption can enable fast-recovery of the counter-value used for encryption. Note that if an attacker tries to replay old data along with their phase bits, then the Merkle Tree verification will detect the tampering due to a mismatch in the resulting root of the Merkle Tree.

Although stop-loss along with phase storage can make the recovery time practical, adding more bits in memory for each cache line is tricky for several reasons. First, as discussed in [13], increasing the bus-width requires adding more pins to the processor. Even avoiding extra pins by adding extra burst in addition to the 8 bursts of 64-bit bus width for each 64B block is expensive and requires support from DIMMs in addition to underutilization of data bus (only few bits are written in the 64-bit wide memory bus in the last burst). DIMM means dual in-line memory module, which is a module that has one or more random access memory chips on a circuit board that can be attached to the motherboard through pins.

Second, major memory organization changes are needed, e.g., row-buffer size, memory controller timing and DIMM support. Additionally, cache blocks are no longer 64B aligned, which can cause complexity in addressing. Finally, extra bit writes are needed for each cache line to reflect the counter phase, which can map to a different memory bank, hence additional occupation of bank for write latency.

To retain the advantages of stop-loss paired with phase bookkeeping but without extra bits, the ECSC or Osiris scheme repurposes already existing ECC bits as a fast counter recovery mechanism. The following subsection will discuss in detail how ECSC or Osiris scheme can elegantly employ ECC bits of data to find out the counter used for encryption.

Design

The ECSC or Osiris scheme relies on inferring the correctness of an encryption counter by calculating the ECC associated with the decrypted text and comparing it with that encrypted and stored with the encrypted cacheline. In conventional (not encrypted) systems, when the memory controller 1225 writes a cache block to the NVM memory 1250 it also calculates its ECC, e.g., hamming code, and stores it with the cacheline.

In other words, the tuple that will be written to the memory 1250 when writing cache block X to memory 1250 is {X, ECC(X)}. In contrast, in encrypted memory systems, there are two options to calculate ECC. The first option includes using the plaintext, then encrypting it with the cacheline before writing both to memory. The second option includes encrypting the plaintext, then calculating the ECC over the encrypted block before both are written to memory. Although the approach allows overlapping decryption and ECC verification, most ECC implementations used in memory controllers, e.g., SECDED Hsiao Code [16], take less than a nanosecond to complete [17]-[19], which is negligible compared to cache or memory access latencies [20]. Additionally, pipelining the arrival of bursts with decryption and ECC bits decoding will completely hide the latency. However, it is observed that calculating ECC bits over the plaintext and encrypting it along with the cacheline can provide low-cost and fast way of verifying the correctness of the encryption/decryption operation. Specifically, in counter mode encryption, the data is decrypted using the following: $\{X, Z\} = E_{key}(IV_X) \oplus Y$, where Y is supposedly/potentially the encryption of X along with its ECC and Z is potentially equal to ECC(X). In conventional systems, if ECC(X)≠Z, then the reason is definitely an error (or tampering) occurred on X or Z. However, when counter-mode encryption is used, the reason could be that an error (or tampering) occurred on X or Z, or the wrong IV is used to do the encryption (i.e., decryption is not done successfully).

Observation 3

When the ECC function is applied over the plaintext and the resulting ECC bits are encrypted along with the data, the ECC bits can provide a sanity-check for the encryption counter. Any tampering with the counter value will be detected by a clear mismatch of the ECC bits that result from that invalid decryption; results of $E_{key}(IV_{old})$ and $E_{key}(IV_{new})$ are very different and independent. Note that in a Bonsai Merkle Tree, data-integrity is protected through MAC values that are calculated over each data and its corresponding counter. While relying on ECC for sanity-checking, the ECC bits can fail to provide guarantees as strong as cryptographic MAC values. Accordingly, Bonsai Merkle Trees may be adopted to add additional protection for data integrity. However, ECC bits, when combined with counter-verification mechanisms, can provide tamper-resistance as strong as the error detection of the used ECC algorithm.

Stream ciphers, e.g., counter (CTR) and output feedback (OFB) modes, do not propagate errors (i.e., an error in ith bit of encrypted data will result in an error in ith bit of decrypted data), hence the reliability is not affected. In encryption modes where an error in encrypted data can result in completely unrelated decrypted text, e.g., block cipher modes, careful consideration is required as encrypting ECC bits can render them useless when there is an error. For the scheme, the inventors focus on state-of-the-art memory encryption, which commonly uses CTR-mode for security and performance reasons.

Now the question is how to proceed when there is an error detected due to a mismatch between the expected ECC and the stored ECC (obtained after decryption). As the reader would expect, the first step is to find if the error is correctable using the ECC code. Table I lists some common ECC errors and their associated fixes.

TABLE 1

Common Sources of ECC Mismatch

| Error Type | Common fix |
|---|---|
| Error on stored data | Can be fixed if the error is correctable, e.g., single bit failure |
| Error on ECC | Typically, unrecoverable |
| Stale/Wrong IV | Speculate the correct IV and verify |

As shown in Table I, one reason for such an ECC mismatch is using an old IV value. To better understand how this can happen, recall the counter cache persistence issue. If a cache block is updated in memory, it is also necessary to update and persist its encryption counter, for both security and correctness reasons. Given the ability to detect the use of stale counter/IV, it can implicitly reason about the likelihood of losing the most-recent counter value due to a sudden power loss. To that extent, in theory, the embodiments may try to decrypt the data with all possible IVs and stop when an IV successfully decrypts the block (i.e., the resulting ECC matches the expected one ECC(X)=Z). At that point, there is a high chance that the IV was actually the one used to encrypt the block, but it was either lost due to inability to persist the new counter value after persisting the data, or due to a relaxed scheme. The ECSC or Osiris scheme builds upon the later possibility; it uses a relaxed counter persistence scheme to employ ECC bits to verify the correctness of the counter used for encryption. As discussed earlier, it is impractical to try all the possible IVs to infer the IV used to encrypt the block, thus the ECSC or Osiris scheme deploys the stop-loss mechanism to limit such possibility to only N updates of a counter (i.e., the correct IV should be within [IV+1, IV+N]) where IV is the most recent IV that was stored/persisted in memory 1250. Note that once the speculated/chosen IV passes the first check through ECC sanity-check it also needs to be verified through Merkle Tree.

The embodiments herein include two modes for the ECSC or Osiris scheme. The first mode is a baseline ECSC or Osiris scheme. The second mode includes an ECSC-Plus or Osiris-Plus scheme. In baseline ECSC or Osiris scheme, during normal operation, all counters being read from memory 1250 reflect their most-recent values; the most-recent value is either updated in cache or has been evicted/written-back to memory. Thus, inconsistency between counters in memory and counters in counter cache 1216 can happen due to crash or tampering with counters in memory. In contrast, the ECSC-Plus or Osiris-Plus scheme strives to even outperform Battery-Backed Write-Back counter-cache scheme through purposely skipping counter updates and recovering their most-recent values when reading them back, hence inconsistency can happen during normal operation. Below is a further discussion on both baseline Osiris and Osiris-Plus schemes.

Normal Operation Stage

During normal operation, the ECSC or Osiris scheme adopts a write-back mechanism by updating memory counters only when evicted from the counter cache 1216. Thus, the ECSC or Osiris scheme can find the most-recent counter value either in counter cache 1216 or by fetching it from memory 1250 in the case of miss. Accordingly, in normal operation, the ECSC or Osiris scheme is similar to conventional memory encryption except that a counter is persisted once each Nth update—acting like a write-through for the Nth update of each counter. In contrast, the ECSC-Plus or Osiris-Plus scheme allows occasional dropping of the most-recent values of encryption counters by relying on run-time recovery mechanisms of the most-recent values of counters. In other words, the ECSC-Plus or Osiris-Plus scheme relies on trying multiple possible values on each counter miss to recover the most-recent one before verifying it through a Merkle Tree; the ECSC or baseline Osiris scheme only does this at system recovery time.

By way of non-limiting example, a "miss" is when an address is looked up into the cache and is not found which may be the result of at least one event which changes or deletes stored data, counter cache data, and Merkle Tree cache data. The event may be the result of a malicious attack, unauthorized tempering of data or an internal or external interruption of normal memory operations.

System Recovery Stage

During system recovery time, both Osiris and Osiris-Plus schemes must reconstruct the Merkle Tree at the time of restoration. Furthermore, both need to use the most-recent values of counters to reconstruct a tree that has a root that matches the root stored in the secure processor. In both Osiris and Osiris-Plus schemes, the system recovery will start by traversing all memory locations (cache lines) in an integrity verified region (all memory in secure NVM). For each cache line location (i.e., 64B address), the memory controller 1225 uses the ECC value after decryption as a security check of the counter retrieved from memory 1250. However, if the counter value fails the check, all possible N values must be checked to find the most-recently used counter value. Later, the correct value will overwrite the current (stale value) counter in memory. After all memory locations are checked, the Merkle Tree will be reconstructed with the recovered counter values and, eventually, build up all intermediate nodes and the root. In the final step, the resulting root will be compared with that saved and kept in the processor. If a mismatch occurs, the data integrity of the memory cannot be verified, and it is very likely that an attacker has replayed both counter and corresponding encrypted data+ECC blocks.

Next, the design of Osiris and Osiris+Plus schemes will be described below including the steps of read and write operations in both schemes.

ECSC or Osiris Scheme Read and Write Operations

Figure 12:
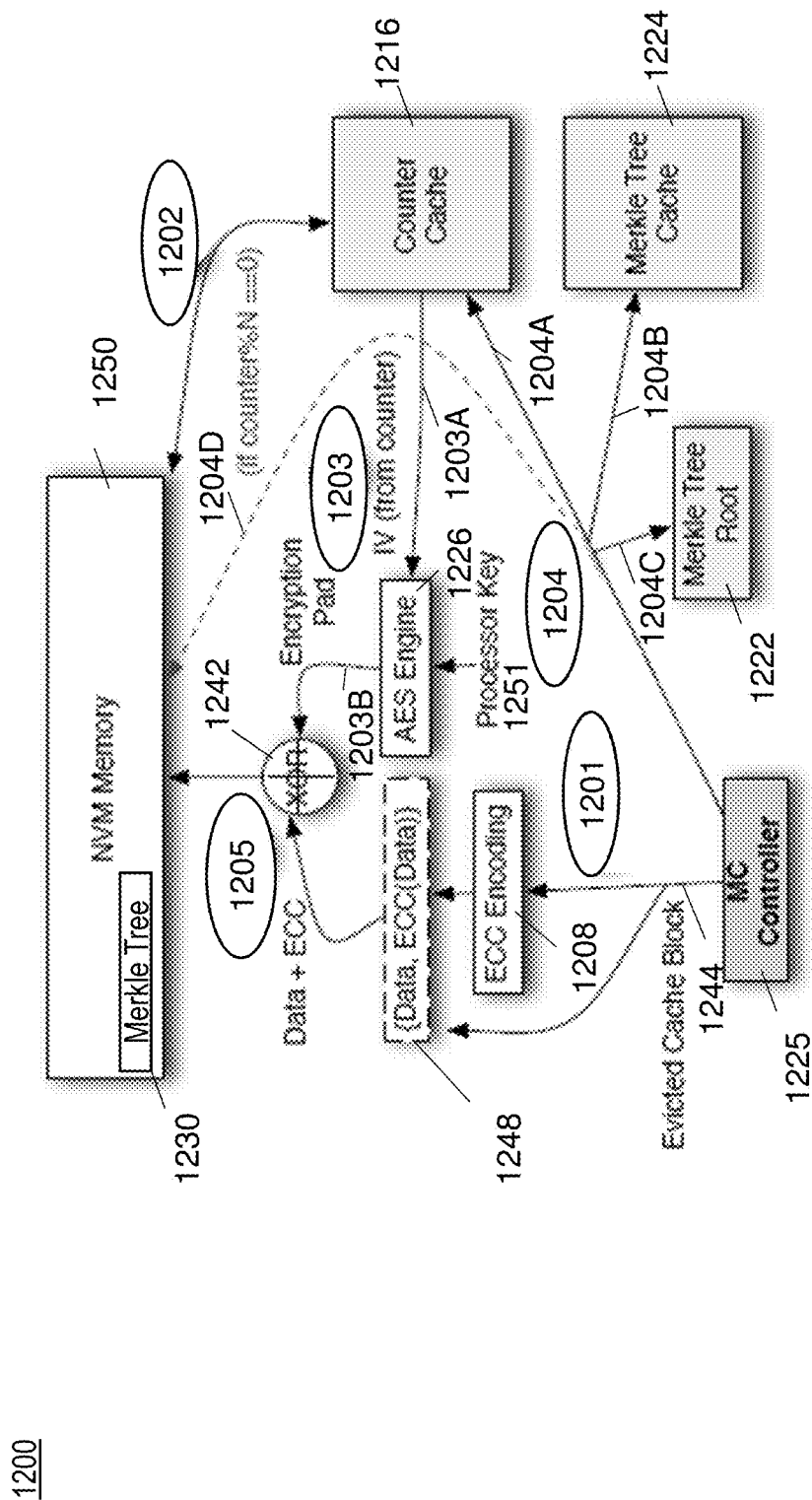
FIG. 12 illustrates a block diagram of an encryption counter security check (ECSC) or Osiris scheme write operation.

FIG. 12 illustrates a flow diagram 1200 of an ECSC or Osiris scheme write operation. As shown in FIG. 12, during a write operation, once a cache block is evicted from left level cache (LLC) 915 (FIG. 9), the memory controller 1225 will calculate the ECC of the data in the block, denoted in dashed box 1248, as shown in Step 1201, such as by encoding the data by encoder 1208. The dashed box 1248 includes both a block of data and its corresponding calculated ECC bits. Note that write operations happen in the background and are typically buffered in the write-pending queue. In Step 1202, the memory controller 1225 obtains the corresponding counter in the event of a miss and evict/write-back the evicted counter block, if dirty. The counters in the counter cache were previously described in relation to FIG. 7 and will not be repeated here. The counter value obtained from Step 1202 will be used to generate the IV, on line 1203A from the counter to proactively generate the encryption pad, on line 1203B via the engine 1226, as shown in Step 1203. In Step 1204, the counter value will be verified (in case of miss) and the counter, on line 1204A, and affected Merkle Tree (including the root node) are updated in the Merkle Tree cache 1224, on line 1204B, Merkle Tree root 1211, on line 1204C, and Merkle Tree 1230, on line 1204D, in the NVM memory 1250. The term "Merkle Tree" includes the Merkle Tree (MT) cache and the MT root values. Unlike a typical write-back counter-cache, if the new counter value is a multiple of N or 0, then the new counter value is persisted before proceeding. Finally, in step 1205, the data+ECC is encrypted using the encryption pad, via XOR 1242, from the encryption engine 1226 using key 1251 and written to NVM memory 1250.

Figure 13:
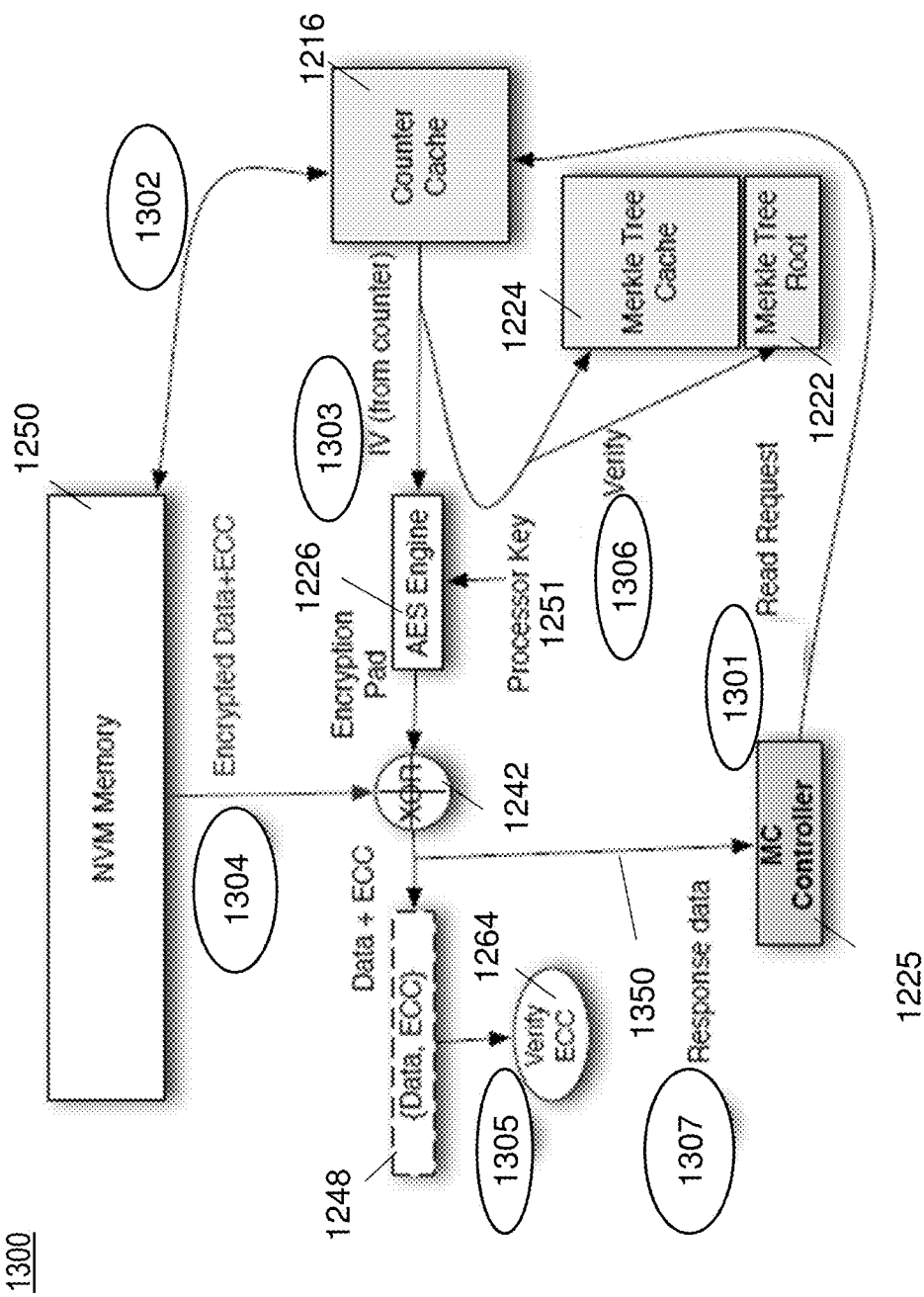
FIG. 13 illustrates a block diagram of an ECSC or Osiris scheme read operation.

FIG. 13 illustrates a flow diagram 1300 of an ECSC or Osiris scheme read operation. During a read operation or request at step 1301, as shown in FIG. 13, the memory controller 1225 will obtain the corresponding counter value from the counter cache 1216 (in the case of hit) or memory 1250 (in the case of a miss) and evict the victim block, if dirty, as shown in 1302. The counter value will be used to create an IV and to generate the encryption pad, via the encryption/decryption engine 1226, as shown in Step 1303. In Step 1304, the actual data block (encrypted data+ECC) is read from memory and decrypted using the encryption pad generated, in Step 1303, via XOR 1242. Block 1248 in dashed lines represented decrypted data+ECC. In Step 1305, traditional ECC checking occurs in a verification process 1264, via verification module 129, by the processor. The ECC checking may be configured to correct one or more errors in the decrypted data of the block. Furthermore, the recovery, whether caused by a crash or cyberattack, may use the same ECC bits for a security check of the encryption counter values, after decryption and decoding, via verification module 147. Finally, if the counter block is fetched from memory (miss), the integrity of the counter value is verified, as shown in Step 1306, via the processor as part of the verification process. Finally, as shown in Step 1307, the memory controller 1225 receives the decrypted data, which is then forwarded to the cache hierarchy by the memory controller 1225. Note that many of the steps can be overlapped without any conflicts, for instance, Step 1306 and steps 1304 and 1305. A "hit" is an instance where an address or expected data was found or matched.

ECSC-Plus or Osiris-Plus Scheme Read and Write Operations

The write operation in ECSC-Plus or Osiris-Plus Scheme is very similar to the write-operation in the ECSC or baseline Osiris scheme. A difference is that it does not write back evicted dirty blocks from the counter cache, as could happen in Step 1202 of FIG. 12. Instead, the ECSC-Plus or Osiris-Plus scheme recovers the most-recent value of the counter each-time it is read from memory and only updates it in memory each Nth update.

Figure 14:
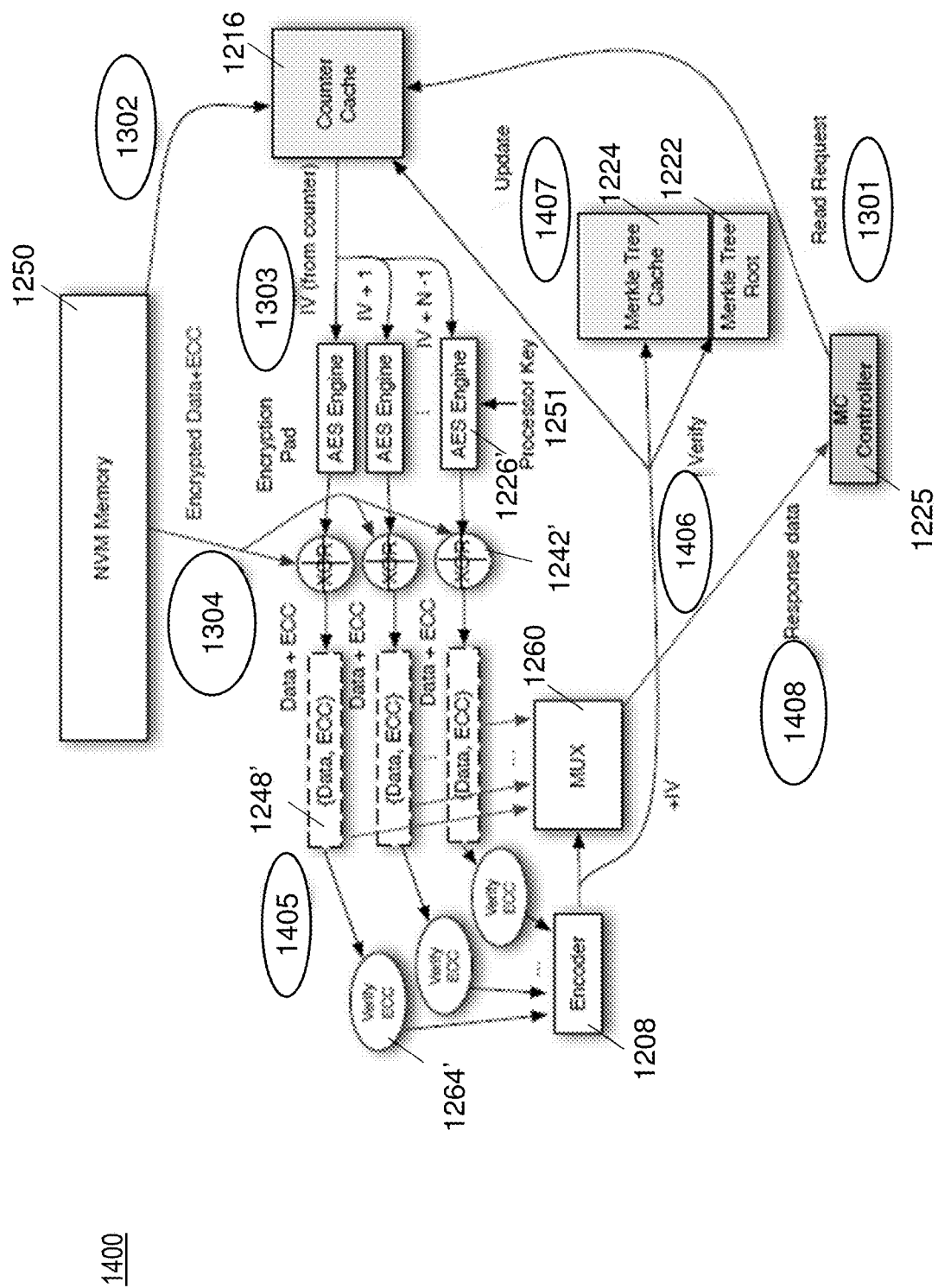
FIG. 14 illustrates a block diagram of an ECSC-Plus or Osiris-Plus scheme read operation.

FIG. 14 illustrates a block diagram 1400 for an ECSC-Plus or Osiris-Plus scheme read operation. The main difference between ECSC/Osiris and ECSC-Plus/Osiris-Plus schemes is shown in Steps 1405 and 1406 in FIG. 14 as compared to FIG. 13 and the parallel operations. Like operations of FIG. 13 have the same reference numerals and will not be repeated in the discussion of FIG. 14. The ECSC or Osiris-Plus scheme utilizes additional AES encryption engines 1226' and ECC units to allow fast recovery of the most-recent counter value. Note that given the fact that most AES encryption engines 1226' are pipelined, and the candidate counter values are sequential, using a single encryption engine instead of N engines can only add N extra cycles. The candidate IVs are labeled IV, IV+1, . . . , IV+N−1. Accordingly, the plurality of engines 1226' will each generate a different encryption pad using the corresponding IV in combination with processor key 1251. The encrypted data+ECC obtained from memory 1250 is decrypted by each of a plurality of parallel XORs 1242'. Each XOR receives a different one encryption pad based on the sequential counter values. The output of each XOR produces parallel streams of decrypted data+ECC bits denoted by dashed boxes 1248'. The ECC bits of each stream of data+ECC bits is verified by a verification process 1264' and encoded/decoded 1208 (decoded). The verified data after decoding is multiplexed by multiplexer 1260.

Once a counter value is detected via the IV, through post-decryption ECC verification, to be the most recent one, at step 1406, the counter value will be verified through a Merkle Tree (i.e., MT cache 1234 and MT root 1232) similar to ECSC or baseline Osiris scheme. Once the counter is verified, the data resulting from decrypting the ciphertext with the most-recent counter value will be returned to the memory controller 1225, at step 1408. Note that the recovered counter value is updated in the counter-cache, as shown in Step 1407.

Reliability and Recovery from Crash

As mentioned earlier, to recover from a crash, ECSC or Osiris and ECSC-Plus or Osiris-Plus scheme must first recover the most-recent counter values utilizing the post-decryption ECC bits to find the correct counters. The Merkle Tree (MT) will then be constructed, and the resulting MT root 1222 will be verified and compared with the root kept in the processor. While the process seems reasonably simple, it can get complicated in the presence of errors. Specifically, uncorrectable errors in the data or encryption counters make generating a matching Merkle Tree root 1222 impossible, which means that the system is unable to verify the integrity of memory. Note that such uncorrectable errors will have the same effect on integrity-verified memories even without deploying the ECSC or Osiris plus.

Uncorrectable errors in encryption counters protected by a Merkle Tree can potentially fail the recovery process. Specifically, when the system attempts to reconstruct the Merkle Tree, it will fail to generate a matching root. Furthermore, it is not feasible to know which part of the Merkle Tree causes the problem. Only the MT root 1222 is maintained; all other parts of the tree should generate the same root, or none should be trusted.

One way to mitigate this single-point of failure is to keep other parts of the Merkle Tree in the processor and guarantee they are never lost. For instance, for an 8-ary Merkle Tree, the 8 immediate children of the root are also saved. In a more capable system, the root, its 8 immediate children and their children are kept—a total of 73 MAC values. If the recovery process fails to produce the root of the Merkle Tree, one can look at which children are mismatched and declare that part of the tree as un-verifiable and warn the user/OS. While the inventors provide insight into this problem, it was assumed that the system choose to only save the root. However, having more NVM registers inside the processors to save more levels of the Merkle Tree can be implemented for high error systems.

To formally describe the recovery process success rate, two cases are described. In the first case, when no errors occur in the data, since each 64B memory block has 8B ECC (64 bits), the probability that a wrong counter results in correct (indicate no errors) ECC bits for the whole block is only $$\frac{1}{2^{64}}$$

(i.e., similar probability to guessing a 64-bit key correctly) which is next to impossible. Note that each 64B block is practically divided into 8 64-bit words [21], each has its own 8-bit ECC (i.e., each bus burst will have 64-bit data and 8-bit ECC for a total of 72 bits). This is why most ECC-enabled memory systems will have 9 chips per rank instead of 8, where each chip provides 8 bits. The 9th chip provides the ECC 8-bits for the burst/word. Also note that the 64B block will be read/written as 8 bursts on a 72-bit memory bus.

Bearing in mind the organization of ECC codewords for each 64 byte (B) memory block, let's now discuss the case where there is actually an error in data. For an incorrect counter, the probability that an 8-bit ECC codeword indicates that there is no error is $$P_{no\text{-}error} = \frac{1}{2^8}$$

and the probability or not indicating that there is no-error (i.e., that there is an error) is $$P_{error} = 1 - \frac{1}{2^8}.$$

The probability that k codewords of the 8 ECC codewords indicates an error can be represented by Bernoulli Trial as $$P_k = \binom{8}{k} \times \left(1 - \frac{1}{2^8}\right)^K \times \left(\frac{1}{2^8}\right)^{8-K}.$$

For example, P2 represents the probability of having 2 of the 8 ECC codewords flagging an error for a wrongly decrypted data and ECC (semi-randomly generated). Accordingly, if encryption counters are filtered that have a metric of 4 or more ore ECC codewords indicating an error, then the probability of success in detecting wrong counters can be given by $P_{k\geq 4}=1$ ($P_0+P_1+P_2+P_3$). Then $P_{k\geq 4}$ is nearly 100% (improbability less than $5.04\times 10^{-11}$). Thus, by filtering out counters cause 4 or more incorrect ECC codewords, then with a probability of almost 100% detect any wrong counter. However, if the data has 4 or more (out of 8) words with at least an error on each of them, then also the correct counter will be filtered out and Merkle Tree verification will be used with each of the possible counter values to identify the correct counter before correcting data. In other words, the ECSC or Osiris scheme will reliably filter out wrong counters immediately except for the rare case of having at least 4 words each with at least an error in the same data block. However, since in case of the ECSC or Osiris scheme only few thousands of blocks (those were in cache) are stale at recovery time, the probability that one of them corresponds to a data block that has 4 or more faulty words is very small, which then would cause an additional step to find the correct counter. Note that the ECSC or Osiris scheme does not affect reliability but rather incurs additional step for identifying the correct counter when the original data has large number of faulty words.

It is also important to note that many PCM prototypes use similar ECC organization but with larger number of ECC bits per 64-bit words, e.g., 16-bit ECC for each 64-bit word [22], which makes detection success rate even closer to perfect. Specifically, using Bernoulli trial for 16-bit ECC per word, the probability of a wrong counter causes 5 or more mismatching ECC codewords is almost 100% (improbability less than $2\times 10^{-13}$), and thus only blocks with at least 5 (out of 8) words are faulty would require additional Merkle Tree verification to recognize the correct counter. Finally, in the rare case that a wrong counter is falsely not filtered out, the ECSC or Osiris scheme will rely on Merkle Tree to identify the correct counter from those not filtered out.

Systems without ECC

Instead of ECC bits, some systems employ MAC values that can be co-located with data [8]. For instance, the ECC chips in the DIMM can be used to store the MAC values of the Bonsai Merkle Tree, allowing the system to obtain data integrity-verification MACs along with the data. While the description of the Osiris and Osiris-Plus schemes focuses on using ECC, MAC values can also be used for the same purpose—as a sanity-check for the decryption counter. The only difference is when an error is detected. With ECC, the number of mismatched bits can be used to guess the counter value. This isn't true for MAC values, which tend to differ significantly in the presence of an error. To solve this problem, MAC values that are aggregations of multiple MAC-Per-Word, e.g., 64 bits that are made of 8 bits for each 64 data bits, are used. The difference between the generated MACs and the stored MACs for different counter values can be used as a selection criterion for the candidate counter value. The embodiments also work with ECC and MAC co-designs such as Synergy (parity+MAC) [8].

Security of Osiris and Osiris-Plus

Since Osiris and Osiris-Plus schemes use Merkle Trees for final verification, they have security guarantees and tamper-resistance similar to any scheme that uses a Bonsai Merkle Tree, such as state-of-the-art secure memory encryption schemes [4], [6], [8].

Evaluation

The performance of the ECSC or Osiris scheme has been evaluated with other state-of-the-art persisting cache designs. The methodology used for the experiments is described. The performance impact of the design for the ECSC/ECSC-Plus or Osiris scheme Osiris/Osiris Plus in terms of limit value and the performance comparison with other cache designs will be described.

Methodology the ECSC or Osiris scheme was modelled in Gem5 [24] with the system configuration presented in the Table II below. The inventors implemented a 256 KB, 16-way set associative counter cache, with a total number of 4K counters. To stress-test the design, memory-intensive applications were selected. Specifically, the inventors select eight memory-intensive representative benchmarks from the SPEC2006 suite [25] and from proxy applications provided by the U.S. Department of Energy (DoE) [26]. The goal is to evaluate the performance and the write traffic overheads of the design. In all experiments, the applications are fast-forwarded to skip the initialization phase, and then followed by the simulation of 500 million instructions. Similar to prior work [9], it was assumed that the overall AES encryption latency to be 24 cycles, and fetching data was overlapped with encryption pad generation.

TABLE II

Configuration of Simulated System

| Processor | |
|---|---|
| CPU | 4-core, 1 GHz, out-of-order × 86-64 |
| L1 Cache | Private, 2 cycles, 32 KB, 2-way, 64 B block |
| L2 Cache | Private, 20 cycles, 512 KB, 8-way, 64 B block |
| L3 Cache | Shared, 32 cycles, 8 MB, 64-way, 64 B block |

DDR-based PCM Main Memory

| | |
|---|---|
| Capacity | 16 GB |
| PCM Latencies | 60 ns read, 150 ns write [23] |
| Organization | 2 ranks/channel, 8 banks/rank, 1 KB row buffer, Open Adaptive page policy, RoRaBaChCo address mapping |
| DDR Timing | tRCD 55 ns, tXAW 50 ns, tBURST 5 ns, tWR 150 ns, tRFC 5 ns [13], [23] tCL 12.5 ns, 64-bit bus width, 1200 MHz Clock |

Encryption Parameters

| | |
|---|---|
| Counter Cache | 256 KB, 16-way, 64 B block |

The RoRaBaChCo corresponds to row, rank, bank, channel and column. The term tRCD stands for Row address to column address delay. The term tXAW is an equivalent to FAW, four-bank activation window. The term tBURST stands for CAS-to-CAS delay for bursts to different bank groups. The term tWR stands for Write recovery time. The term tRFC stands for Row refresh cycle timing. The term tCL stands for CAS (column address strobe) latency. The term DDR stands for double data rate.

Below are the schemes use in the evaluation:

No-encryption Scheme: The baseline NVM system without memory encryption.

The ECSC or Osiris scheme: The base solution that eliminates the need for a battery while minimizing the performance and write traffic overheads.

the ECSC-Plus or Osiris Plus scheme: An optimized version of the ECSC or Osiris scheme that also eliminates the need for evicting dirty counter blocks at the cost of extra online checking to recover the most recent counter value. The term "dirty" means that the cache block has been modified and is inconsistent with the data in the memory.

Write-through (WT) scheme: A strict counter-atomicity scheme that, for each write operation, enforces both counter and data blocks to be written to NVM memory. Note that this scheme does not require any unrealistic battery or power supply hold-up time.

Write-back (WB) scheme: A battery-backed counter cache scheme. The WB scheme only writes to memory dirty evictions from counter cache. However, the WB scheme assumes a battery is sufficient to flush all dirty blocks in counter cache.

Analysis

The purpose of the ECSC/ECSC-Plus or Osiris/Osiris-Plus scheme is to persist the encryption counters in NVM memory 1250 in response to system crash recovery but with reduced performance overhead and write traffic. Therefore, the selection of number N for update interval is critical in determining the performance improvement. As such, in this section, the impact of choosing different N (limit) was studies for the ECSC/ECSC-Plus or Osiris/Osiris-Plus scheme on performance. Next, the performance analysis of multiple benchmarks in response to different persistent schemes discussed and compared herein are discussed. The evaluation results are consistent with the goal of the design for the ECSC/ECSC-Plus or Osiris/Osiris-Plus scheme.

Impact of ECSC or Osiris Limit

Figure 15:
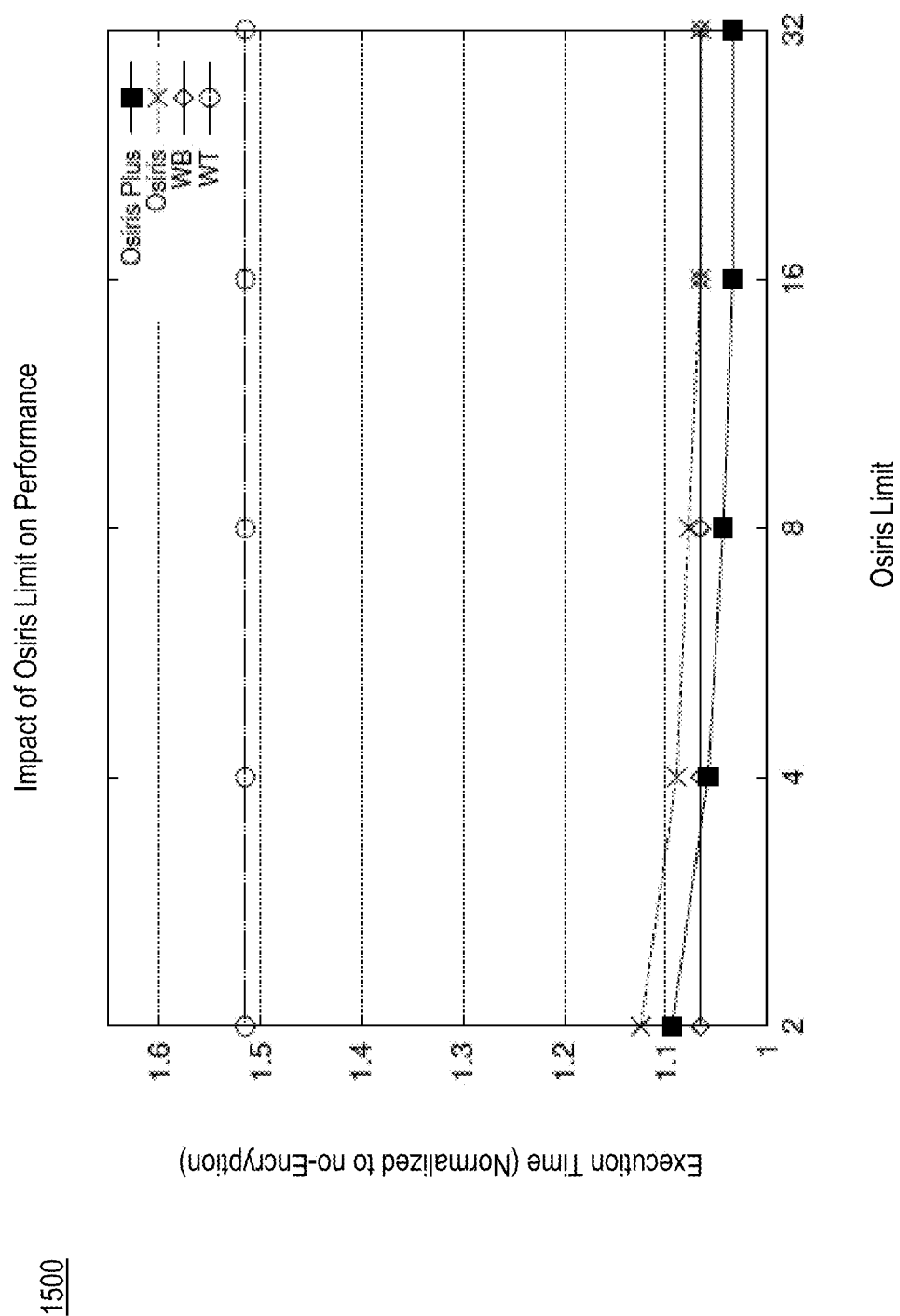
FIG. 15 illustrates a graphical representation of an impact of Osiris limit on performance.

FIG. 15 illustrates a graphical representation 1500 of an impact of ECSC or Osiris limit on performance. To understand the impact of ECSC or Osiris limit (also called N) on performance and write traffic, vary the limit in multiples of two and observe the corresponding performance and write traffic. FIG. 15 shows the performance of ECSC or Osiris scheme, denoted as a dashed with X line curve, and ECSC-Plus or Osiris-Plus scheme, denoted as a solid line curve with a black square, normalized to no-encryption while varying the limit. FIG. 15 also shows WB, denoted as a solid line curve with diamonds, and WT, denoted as a solid line curve with circles, performance normalized to no-encryption to facilitate the comparison From FIG. 15, it can be observed that both Osiris and Osiris-Plus schemes benefit clearly from increasing the limit. However, as discussed earlier, having large limit values can cause increase in recovery time and potentially large number of encryption engines and ECC units (in case of Osiris-Plus scheme). Accordingly, it is important to find the point which can no longer bring in justifiable gains if increased. From FIG. 15, it can be observed that ECSC or Osiris scheme at limit 4 has an average performance overhead of 8.9% compared to 6.6% and 51.5% for WB and WT, respectively. In contrast, also at limit 4, ECSC-Plus or Osiris-Plus scheme has only 5.8% performance overhead, which is even better than WB scheme. Accordingly, it can be observed that at limit 4, both Osiris and Osiris-Plus schemes perform close to or outperform the WB scheme even though they do not need any battery or hold-up power. In large limit values, e.g., 32, the ECSC or Osiris scheme performs similar to write-back; dirty blocks will be evicted before absorbing the limit of number of writes; hence the counter block is rarely persisted before eviction. In contrast, the ECSC-Plus or Osiris-Plus scheme brings down the performance overheads to only 3.4% (compared to 6.6% for WB), but again at the cost of large number of encryption engines and ECC units.

Figure 16:
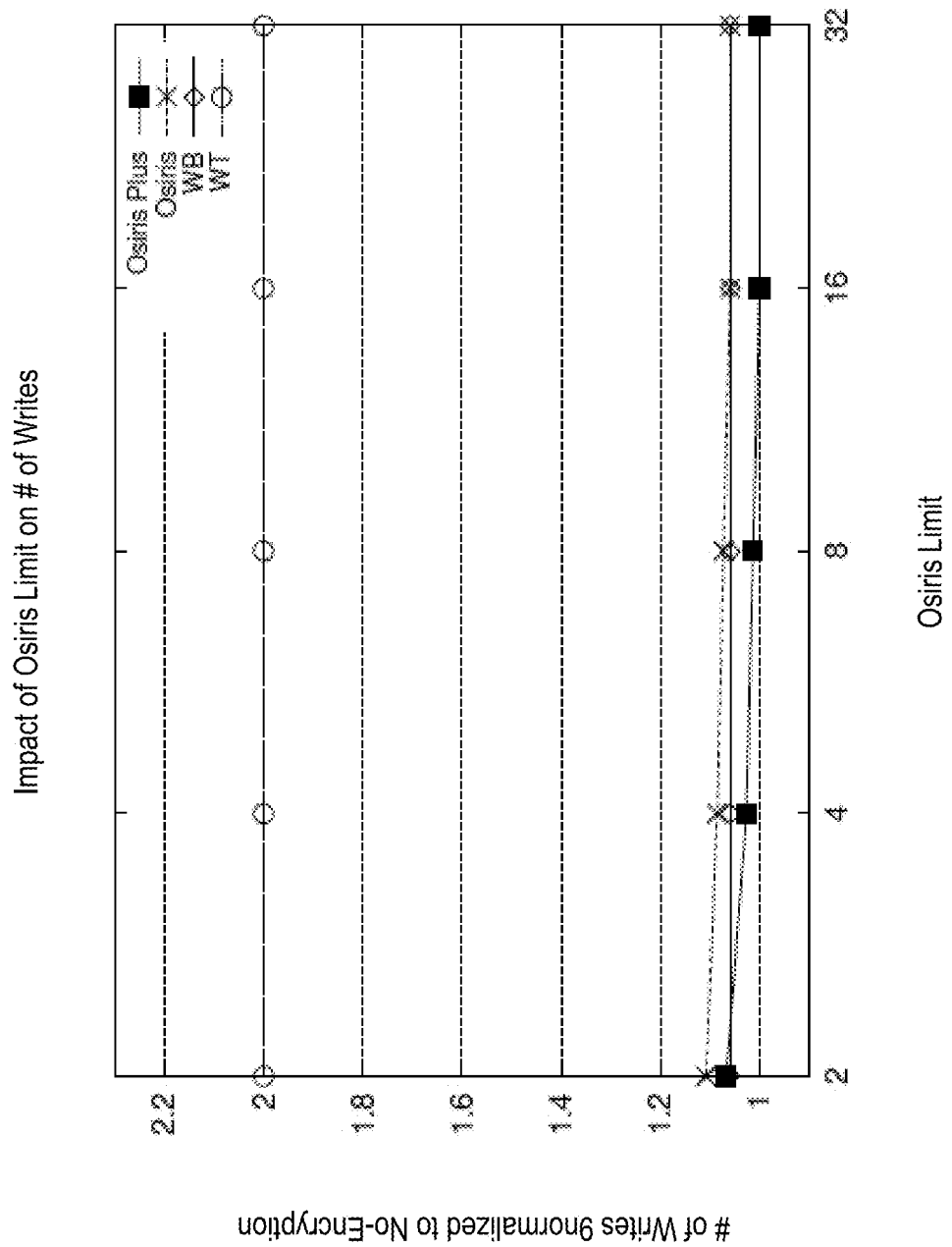
FIG. 16 illustrates a graphical representation of an impact of Osiris limit on a number of writes.

FIG. 16 illustrates a graphical representation 1600 of an impact of ECSC or Osiris limit on a number of writes. A similar pattern can be observed in FIG. 16 demonstrating less write traffic for both schemes. At limit 4, the ECSC or Osiris scheme, denoted as a dashed with X line curve, has a write traffic overhead of 8.5% whereas WB and WT, denoted as a solid line curve with circles, have 5.9% and 100%, respectively. In contrast, at limit 4, the ECSC-Plus or Osiris-Plus scheme has only 2.6% write traffic overhead. With larger limit values, e.g., 32, the ECSC-Plus or Osiris- Plus scheme, denoted as a solid line curve with a black square, has nearly zero extra writes, whereas the ECSC or Osiris scheme has write traffic overhead similar to WB, denoted as a solid line curve with diamonds. Based on this observation, a limit 4 was used as a reasonable trade-off between the performance overhead and the required additional stages or extra checking at the time of recovery.

Figure 17:
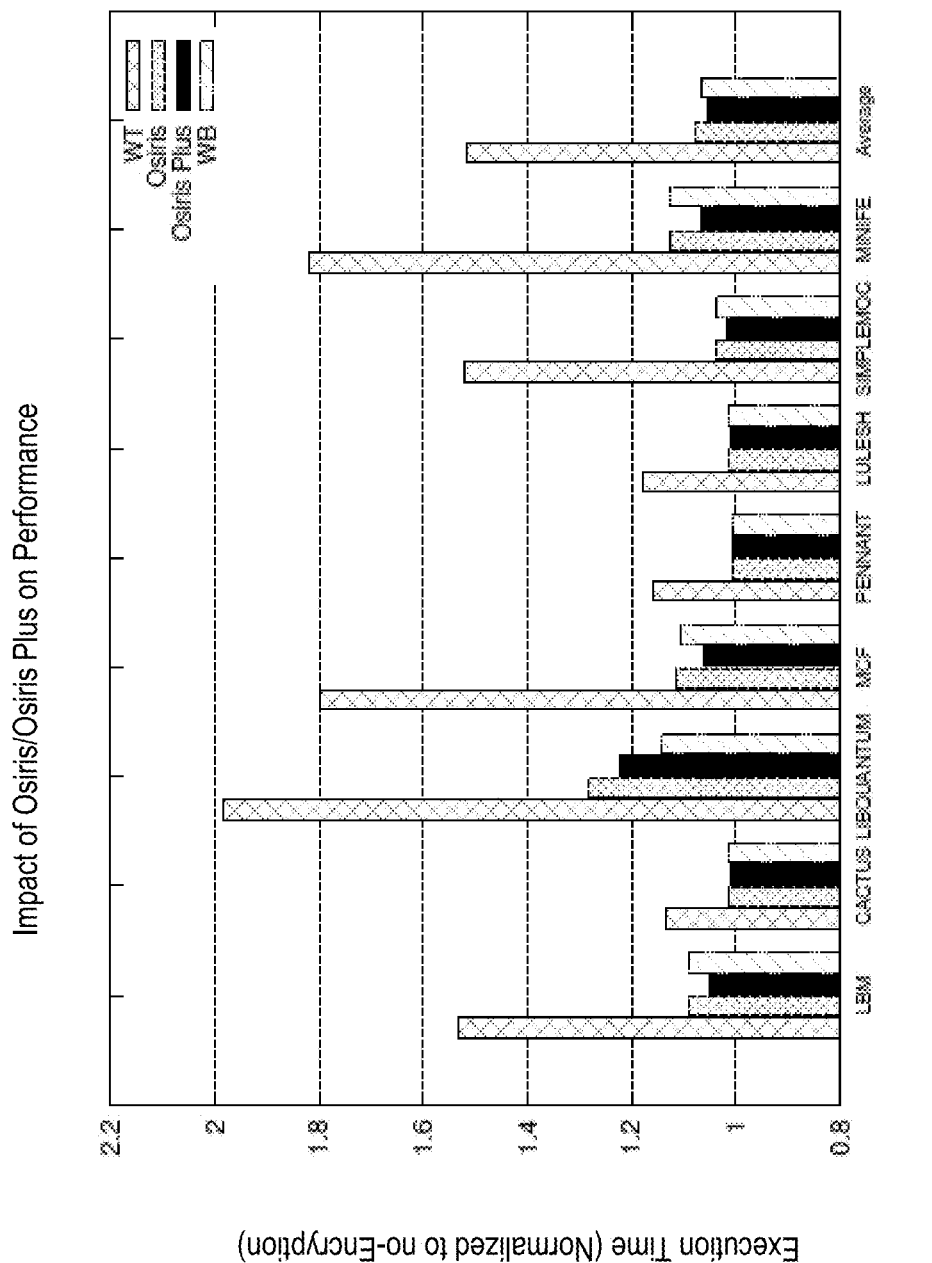
FIG. 17 illustrates a graphical representation of an impact of ECSC/Osiris scheme and ECSC-Plus/Osiris-Plus scheme persistence on performance.
Figure 18:
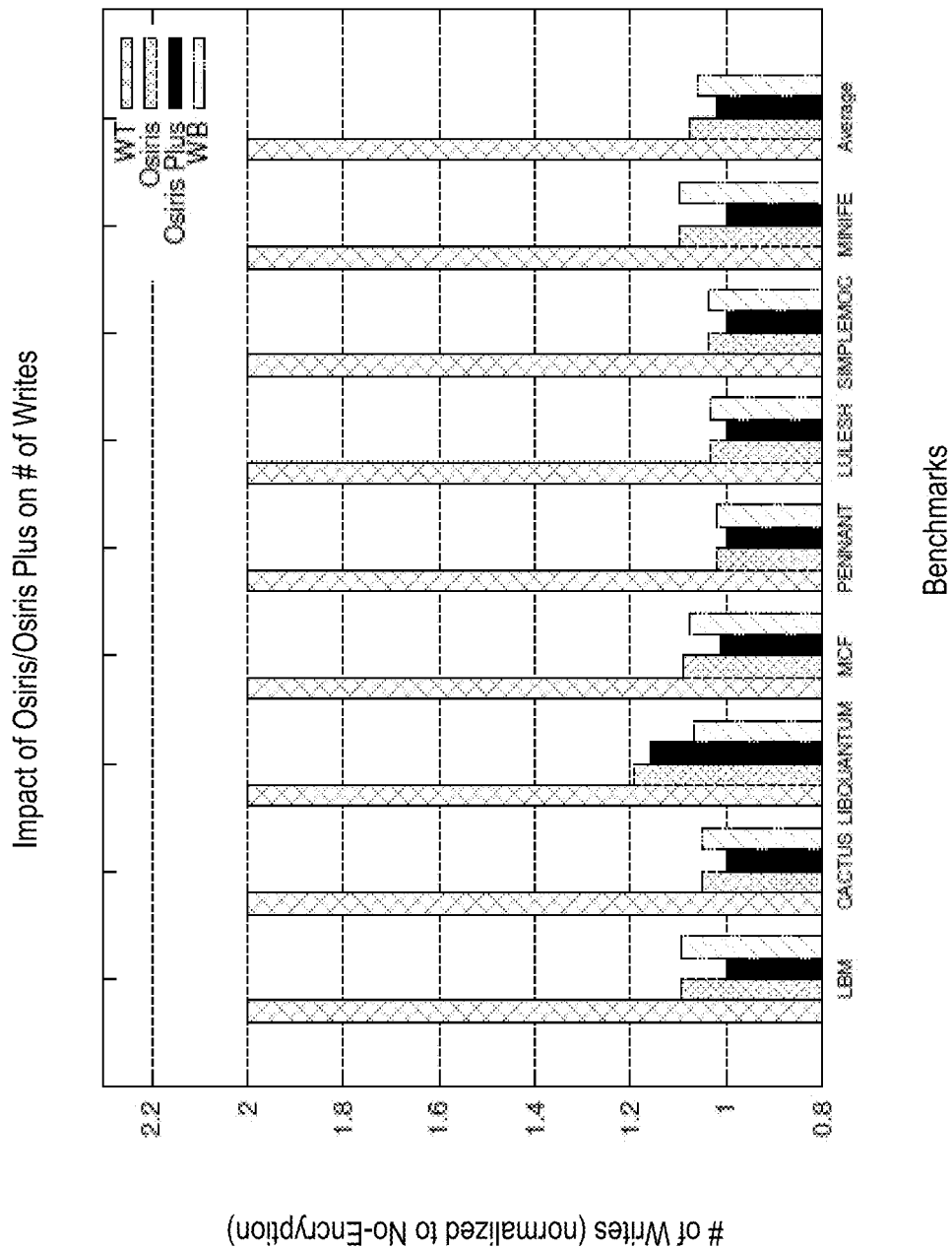
FIG. 18 illustrates a graphical representation of an impact of ECSC/Osiris scheme and ECSC-Plus/Osiris-Plus scheme persistence on a number of writes.

Impact of the ECSC/Osiris and ECSC-Plus/Osiris Plus Schemes Persistency on Multiple Benchmarks FIG. 17 illustrates a graphical representation 1700 of an impact of the ECSC/Osiris and ECSC-Plus/Osiris Plus schemes persistence on performance. FIG. 18 illustrates a graphical representation 1800 of an impact of the ECSC/Osiris and ECSC-Plus/Osiris Plus schemes persistence on a number of writes. As now understood, the overall impact of Osiris-limit (i.e., N) on performance and write traffic, now zoom-in on the performance and write traffic of individual benchmarks when using limit 4 as suggested previously. The benchmarks include LBM, CACTUS, LIBQUANTUM, MCF, PENNANT, LULESH, SIMPLEMOC, MINIFE and Average. As it can be observed from FIG. 17 and FIG. 18, for most of the benchmarks, the ECSC-Plus/Osiris Plus scheme, denoted in a solid black bar, outperforms all other schemes in both performance and reduction in number of writes. Meanwhile, for most benchmarks, ECSC/Osiris scheme, denoted in a small cross-hatching pattern, performs close to WB scheme, denoted as a diagonal hatching pattern. As noted earlier, the ECSC/Osiris scheme performance and write traffic are bounded by the WB scheme; if the updated counters rarely get persisted before eviction from counter cache (i.e., updated less than N time) then ECSC/Osiris scheme performs similar to WB but without need for battery. Note that it is not common to have the same counter updated many times before eviction from counter cache; once a data cache block gets evicted from the cache hierarchy, it is very unlikely that it will be evicted again very soon. However, since ECSC-Plus/Osiris-Plus scheme can additionally eliminate premature (before Nth write) counter evictions, it can actually outperform WB. The only exception as can be observed is Libquantum, which is mainly due to its behavior of repeated streaming behavior over a small array (4 MB array); many cache hierarchy evictions due to conflicts, however, since each counter cache block covers the counters of 4 KB page, many evictions/writes of the same data block will result in hits in the counter cache. Accordingly, a WB scheme performs better as there are few evictions (writebacks) from counter cache compared to the writes due to persistence of counter values at each Nth write in the ECSC/Osiris scheme and the ECSC-Plus/Osiris-Plus scheme. However, it can be observed that with larger limit value, such as 16, the ECSC-Plus/Osiris-Plus scheme clearly outperforms WB (7.8% vs. 14% overhead), whereas the ECSC/Osiris scheme performs similarly. In summary, for all benchmarks, ECSC/Osiris scheme and ECSC-Plus/Osiris-Plus scheme performs better than strict-counter persistence (WT), denoted as a large cross-hatching pattern, and very close or even better than battery-backed WB scheme. In addition, some aggressive cases were tested, such as read latency 300 nanoseconds (ns) and write latency 1000 ns. On average, the ECSC-Plus/Osiris-Plus scheme outperforms WB in both execution overhead and number of writes; ECSC/Osiris scheme, although slightly degraded, is still very close to WB scheme's performance.

Sensitivity to Counter Cache Size

While it is impractical to assume a very large battery-backed write-back cache, the robustness the ECSC/Osiris and ECSC-Plus/Osiris Plus schemes was verified when large counter caches are used. Even at 1 MB cache size, ECSC/Osiris and ECSC-Plus/Osiris Plus schemes have performance overhead of only 3.8% and 3%, whereas WT and WB has 48.9% and 1.4%, respectively. Similarly, ECSC/Osiris and ECSC-Plus/Osiris Plus schemes have write traffic overhead of only 3.8% and 2.6%, whereas WT and WB has 100% and 1.2%, respectively. Note that WB is only slightly better due to the long tenure of cache blocks before eviction. Due to the limited space, different cache sizes between 256 KB and 1 MB were not included, however, the trend is as expected and always in favor of ECSC/Osiris and ECSC-Plus/Osiris Plus schemes.

Recovery Time

At recovery time in a conventional NVM system, the Merkle Tree must be first reconstructed as early as the first memory access. The process will build up the intermediate nodes and the root to compare it with that kept inside the processor. To do so, it will also need to verify the counters' and data integrity through comparison with the MAC calculated over the counter and data.

The ECSC or baseline Osiris scheme, in the worst-case scenario of a crash, probably have lost all the updated counter cache blocks (i.e., 2048 64B counter blocks for a 128 KB counter cache). During recovery, the memory controller 1225 will iterate over all encryption counters and build the Merkle Tree. However, for counters that have a mismatched ECC, an average of 4 trials (when N equals 8) of counter values will be tried before finding the correct value. Thus, for a 16 GB NVM memory 1250, there will be 256M data blocks and 4M counter blocks. Assuming that reading a data block and verifying its counter takes 100 ns, then in a conventional system 100 ns×256M is needed which is roughly 25.6 seconds.

In the ECSC/Osiris scheme, only 131072 counters (corresponding to the lost 2048 counter blocks) will require additional checking. In the worst case, each counter has been updated 8 times, which will need 131072×8×100 ns extra delay, which extends the recovery time to 25.7 seconds—only an additional 0.4% recovery time. Also note that ECSC/Osiris overhead depends on the counter cache size. Using large NVM memory capacity will significantly reduce the overhead percentage due to an increase in actual recovery time.

In contrast, the ECSC-Plus/Osiris-Plus scheme deploys parallel engines that check all possible values in parallel, which means that even for wrong values the detection and verification latency will be similar to those of the correct counters and the correct counter values will be used to build upper intermediate levels. Accordingly, there is no additional overhead in the recovery time for the ECSC-Plus/Osiris-Plus scheme. However, this requires extra parallel ECC and AES engines. Note that most modern processors have multiple memory channels and a high degree of parallelism in memory modules, which makes the cost of 100 ns to sequentially access and verify each block be conservative. The recovery time is estimated to be even faster for both conventional systems and ECSC/Osiris scheme.

Related Work

The relevant work in NVM security will be discussed, mostly in respect to encryption and memory persistence in this section.

NVM Security

Most research advocates counter-mode encryption (CME) to provide strong security while benefiting from short latency due to the overlap of encryption-pad generation with data fetch from memory [4], [6], [13], [27]-[30]. Further optimization is carried out based on this fundamental model. DEUCE [6] proposes a dual-counter CME scheme that only re-encrypts the modified word for each write. SECRET [27] integrates zero-based partial writes with XOR-based energy masking to reduce both overhead and power consumption for encryption. ASSURE [28] further eliminates cell writes of SECRET by enabling partial MAC computation and constructing efficient Merkle Tree. Distinctively, Silent Shredder [4] repurposes the IVs in CME to eliminate the data shredding writes. More recently, Synergy [8] described a security-reliability co-design that co-locates MAC and data for data reconstruction due to single-chip error and for reducing the overall memory traffic. In contrast with prior work, the embodiments herein are the first to provide a security-reliability guaranteed solution for persisting encryption counters for all memory blocks.

Memory Persistence

As a new technology possessing both the properties of main memory and storage, persistent memory has promising recovery capabilities and the potential to replace main memory. Thus, it attracts much attention from both hardware and software research communities [31]-[34]. Pelley et al. [35] refer to memory persistency as the constraints of write ordering with respect to failure and propose several persistency models in either a strict or a relaxed way. DPO [36] and WHISPER [37] are different persistent frameworks that use strict and relaxed ordering, respectively, with different granularities. A conventional persistence model (i.e., cache-line flushing ordered by store-fencing) e.g., CLWB then SFENCE, to persist memory locations [38] is assumed and the inventors focus on the persistence from a hardware perspective. The most related work to ECSC/Osiris scheme is counter-atomicity [13]. Counter-atomicity introduces a counter write queue and a ready bit to enforce write persistence of data and counters from the same request to NVM simultaneously. To reduce the write overhead, counter-atomicity provides some APIs for users to selectively persist self-defined critical data along with their counters, relaxing the need for all-counter persistence. The ECSC/Osiris scheme tackles the same problem but by persisting counters periodically in encrypted NVMs. The ECSC/Osiris scheme relies on ECC bits to provide sanity-check for the used encryption counter and helps with its recovery. While the solution does not require any software modification and is completely transparent to users, it is orthogonal to and can be augmented with selective counter-atomicity scheme. Moreover, ECSC/Osiris and ECSC-Plus/Osiris-Plus schemes can be used in addition to selective counter-atomicity to cover all memory locations at low-cost, hence avoiding known-plaintext attacks as discussed earlier. The work discussed early considered failure as a broad concept [35], whereas some work specifically handles power failure, such as WSP [39] and i-NVMM [5]. By using residual energy and by relying on a battery supply, WSP and i-NVMM can persist data and encryption to NVMM. However, in the embodiments described herein, external battery backup is not required for counter persistence rather rely on ECC-based sanity-check for counters recovery and application-level persistence of data.

CONCLUSION

The ECSC/Osiris scheme persists encryption counters to NVM memory 1250 similar to strict counter persistence schemes but with significant reduction in performance overhead and NVM writes. An optimized version, the ECSC-Plus/Osiris-Plus scheme, is configured to improve the performance by eliminating premature counter evictions. The ECSC/Osiris scheme can be integrated with state-of-the-art data and counter integrity verification (ECC and Merkle tree) for rapid failure/counter recovery.

Eight representative benchmarks show desirable performance overhead and NVM writes when employing the ECSC/Osiris scheme and the ECSC-Plus/Osiris-Plus scheme in comparison with other persistency schemes.

Computational Hardware Overview

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of one or more methods described herein.

A sequence of binary digits constitutes digital data that is used to represent a number or code for a character. A bus 510 includes many parallel conductors of information so that information is transferred quickly among devices coupled to the bus 510. One or more processors 501 for processing information are coupled with the bus 510. A processor 501 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 501 constitutes computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 501 to store temporary values during execution of computer instructions. The computer system 500 also includes a read only memory (ROM) 506, non-volatile persistent storage device or static storage device coupled to the bus 510 for storing static information, including instructions, that is not changed by the computer system 500. The ROM 506 may be a secure memory (storage) device or a direct-access for files (DAX) memory device. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 501 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general, the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 570 sends and receives electrical, acoustic or electromagnetic signals, including infrared and optical signals, that carry information streams, such as digital data.

The term computer-readable medium is used herein to refer to any medium that participates in providing information to processor 501, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 501, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 501, except for carrier waves and other signals.

Logic encoded in one or more tangible media includes one or both of processor instructions on a computer-readable storage media and special purpose hardware, such as ASIC 520.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 501 executing one or more sequences of one or more instructions contained in memory 504. Such instructions, also called software and program code, may be read into memory 504 from another computer-readable medium such as storage device 508. Execution of the sequences of instructions contained in memory 504 causes processor 501 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 501 as it is received or may be stored in storage device 508 or other non-volatile storage for later execution, or both. In this manner, computer system 500 may obtain application program code in the form of a signal on a carrier wave.

Various forms of computer readable media may be involved in carrying one or more sequence of instructions or data or both to processor 501 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red a carrier wave serving as the network link 578. An infrared detector serving as communications interface 570 receives the instructions and data carried in the infrared signal and places information representing the instructions and data onto bus 510. Bus 510 carries the information to memory 504 from which processor 501 retrieves and executes the instructions using some of the data sent with the instructions. The instructions and data received in memory 504 may optionally be stored on storage device 508, either before or after execution by the processor 501.

Figure 6:
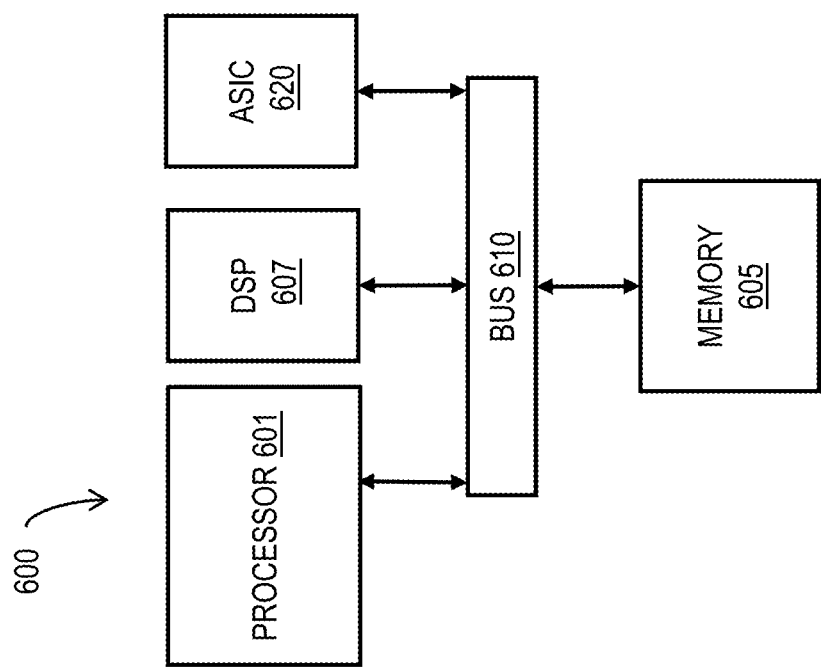
FIG. 6 illustrates a block diagram of a chip set upon which an embodiment of the invention may be implemented.

FIG. 6 illustrates an integrated circuit (IC) chip set 600 upon which an embodiment of the invention may be implemented. Chip set 600 is programmed to perform one or more steps of a method described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of a method described herein.

In one embodiment, the chip set 600 includes a communication mechanism such as a bus 610 for passing information among the components of the chip set 600. A chip or chip portion of the processor 601 has connectivity to the bus 610 to execute instructions and process information stored in, for example, a memory 605. The processor 601 may include one or more processing cores with each core configured to perform independently. A multi-core processor enables multiprocessing within a single physical package. Examples of a multi-core processor include two, four, eight, or greater numbers of processing cores. Alternatively, or in addition, the processor 601 may include one or more microprocessors configured in tandem via the bus 610 to enable independent execution of instructions, pipelining, and multithreading. The processor 601 may also be accompanied with one or more specialized components to perform certain processing functions and tasks such as one or more digital signal processors (DSP) 607, or one or more application-specific integrated circuits (ASIC) 620. A DSP 607 typically is configured to process real-world signals (e.g., sound) in real time independently of the processor 601. Similarly, an ASIC 620 may be implemented on at least one IC chip or chip portions and can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 601 and accompanying components have connectivity to the memory 605 via the bus 610. The memory 605 may include dynamic memory (e.g., RAM, magnetic disk, writable optical disk, etc.), static memory (e.g., ROM, CD-ROM, etc.) and/or secure persistent memory for storing executable instructions of applications that when executed perform one or more steps of a method described herein and for storing files including, without limitations, DAX filesystem files. The memory 605 also stores the data associated with or generated by the execution of one or more steps of the methods described herein. The memory 605 may be implemented on one or more IC chips.

Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article.

REFERENCES

The following references are incorporated herein by reference.

[1] B. C. Lee, P. Zhou, J. Yang, Y. Zhang, B. Zhao, E. Ipek, O. Mutlu, and D. Burger, "Phase-change technology and the future of main memory," in 2010 43*rd Annual IEEE/ACM International Symposium on Microarchitecture (MICRO)*. IEEE, 2010.

[2] Z. Li, R. Zhou, and T. Li, "Exploring high-performance and energy proportional interface for phase change memory systems," *IEEE 20th International Symposium on High Performance Computer Architecture (HPCA)*, 2013.

[3] M. K. Qureshi, J. Karidis, M. Franceschini, V. Srinivasan, L. Lastras, and B. Abali, "Enhancing lifetime and security of pcm-based main memory with start-gap wear leveling," in 2009 *42nd Annual IEEE/ACM International Symposium on Microarchitecture (MICRO)*. IEEE, 2009.

[4] A. Awad, P. Manadhata, S. Haber, Y. Solihin, and W. Horne, "Silent shredder: Zero-cost shredding for secure non-volatile main memory controllers," in *Proceedings of the Twenty-First International Conference on Architectural Support for Programming Languages and Operating Systems*, ser. ASPLOS '16. New York, N.Y., USA: ACM, 2016. [Online]. http://doi.acm.org/10.1145/2872362.2872377

[5] S. Chhabra and Y. Solihin, "i-nvmm: A secure non-volatile main memory system with incremental encryption," in *Proceedings of the 38th Annual International Symposium on Computer Architecture*, ser. ISCA '11. New York, N.Y., USA: ACM, 2011. [Online]. http://doi.acm.org/10.1145/2000064.2000086

[6] V. Young, P. J. Nair, and M. K. Qureshi, "Deuce: Write-efficient encryption for non-volatile memories," in Proceedings of the Twentieth International Conference on Architectural Support for Programming Languages and Operating Systems, ser. ASPLOS '15. New York, N.Y., USA: ACM, 2015. [Online]. Available: http://doi.acm.org/10.1145/2694344.2694387

[7] V. Costan and S. Devadas, "Intel sgx explained." *IACR Cryptology ePrint Archive*, vol. 2016, 2016.

[8] G. Saileshwar, P. J. Nair, P. Ramrakhyani, W. Elsasser, and M. K. Qureshi, "Synergy: Rethinking secure-memory design for error-correcting memories," in *The 24th International Symposium on High-Performance Computer Architecture (HPCA)*, 2018.

[9] A. Awad, Y. Wang, D. Shands, and Y. Solihin, "Obfusmem: A low-overhead access obfuscation for trusted memories," in *Proceedings of the 44th Annual International Symposium on Computer Architecture*. ACM, 2017.

[10] C. Yan, D. Englender, M. Prvulovic, B. Rogers, and Y. Solihin, "Improving cost, performance, and security of memory encryption and authentication," in *ACM SIGARCH Computer Architecture News*, vol. 34, no. 2. IEEE Computer Society, 2006.

[11] J. Chang and A. Sainio, "Nvdimm-n cookbook: A soup-to-nuts primer on using nvdimm-ns to improve your storage performance."

[12] A. M. Rudoff, "Deprecating the pcommit instruction," 2016. [Online]. Available: https://software.intel.com/en-us/blogs/2016/09/12/deprecate-pcommit-instruction

[13] S. Liu, A. Kolli, J. Ren, and S. Khan, "Crash consistency in encrypted non-volatile main memory systems," in 2018 *IEEE International Symposium on High Performance Computer Architecture (HPCA)*, February 2018.

[14] B. Rogers, S. Chhabra, M. Prvulovic, and Y. Solihin, "Using address independent seed encryption and bonsai merkle trees to make secure processors os-and performance-friendly," in 2007 *40th Annual IEEE/ACM International Symposium on Microarchitecture (MICRO)*. IEEE, 2007.

[15] P. Zuo and Y. Hua, "Secpm: a secure and persistent memory system for non-volatile memory," in *10th USENIX Workshop on Hot Topics in Storage and File Systems (HotStorage 18)*. Boston, Mass.: USENIX Association, 2018. [Online]. Available: https://www.usenix.org/conference/hotstorage18/presentation/zuo

[16] M.-Y. Hsiao, "A class of optimal minimum odd-weight-column sec-ded codes," *IBM Journal of Research and Development*, vol. 14, 1970.

[17] S. Cha and H. Yoon, "Efficient implementation of single error correction and double error detection code with check bit pre-computation for memories," *JSTS: Journal of Semiconductor Technology and Science*, vol. 12, 2012.

[18] R. Naseer and J. Draper, "Dec ecc design to improve memory reliability in sub-100 nm technologies," in *15th IEEE International Conference on Electronics, Circuits and Systems, 2008. ICECS 2008*. IEEE, 2008.

[19] R. Naseer and J. Draper, "Parallel double error correcting code design to mitigate multi-bit upsets in srams," in *34th European Solid-State Circuits Conference, 2008. ESSCIRC 2008*. IEEE, 2008.

[20] T. N. Miller, R. Thomas, J. Dinan, B. Adcock, and R. Teodorescu, "Parichute: Generalized turbocode-based error correction for near-threshold caches," in 2010 *43rd Annual IEEE/ACM International Symposium on Microarchitecture (MICRO)*. IEEE, 2010.

[21] T. Instruments, "Discriminating Between Soft Errors and Hard Errors in RAM." [Online]. http://www.ti.com/lit/wp/spna109/spna109.pdf

[22] A. Akel, A. M. Caulfield, T. I. Molloy, R. K. Gupta, and S. Swanson, "Onyx: A protoype phase change memory storage array," in *Proceedings of the 3rd USENIX Conference on Hot Topics in Storage and File Systems*, ser. HotStorage '11. Berkeley, Calif., USA: USENIX Association, 2011. [Online]. http://dl.acm.org/citation.cfm?id=2002218.2002220

[23] B. Lee, E. Ipek, O. Mutlu, and D. Burger, "Architecting phase change memory as a scalable dram alternative," in *International Symposium on Computer Architecture (ISCA)*, 2009.

[24] N. Binkert, B. Beckmann, G. Black, S. K. Reinhardt, A. Saidi, A. Basu, J. Hestness, D. R. Hower, T. Krishna, S. Sardashti, R. Sen, K. Sewell, M. Shoaib, N. Vaish, M. D. Hill, and D. A. Wood, "The gem5 simulator," *SIGARCH Comput. Archit. News*, vol. 39, August 2011. [Online]. http://doi.acm.org/10.1145/2024716.2024718

[25] J. L. Henning, "Spec cpu2006 benchmark descriptions," *SIGARCH Comput. Archit. News*, vol. 34, September 2006. [Online]. http://doi.acm.org/10.1145/1186736.1186737

[26] M. Heroux, R. Neely, and S. Swaminarayan, "Asc co-design proxy app strategy." [Online]. http://www.lanl.gov/projects/codesign/proxy-apps/assets/docs/proxy-apps-strategy.pdf

[27] S. Swami, J. Rakshit, and K. Mohanram, "Secret: Smartly encrypted energy efficient non-volatile memories," in *Proceedings of the 53rd ACM/EDAC/IEEE Design Automation Conference (DAC)*, 2016. IEEE, 2016.

[28] J. Rakshit and K. Mohanram, "Assure: Authentication scheme for secure energy efficient non-volatile memories," in 2017 *54th ACM/EDAC/IEEE Design Automation Conference (DAC)*, June 2017.

[29] S. Swami and K. Mohanram, "Covert: counter overflow reduction for efficient encryption of non-volatile memories," in *Proceedings of the Conference on Design, Automation & Test in Europe*. European Design and Automation Association, 2017.

[30] X. Zhang, C. Zhang, G. Sun, J. Di, and T. Zhang, "An efficient run-time encryption scheme for non-volatile main memory," in *Proceedings of the 2013 International Conference on Compilers, Architectures and Synthesis for Embedded Systems*, ser. CASES '13. Piscataway, N.J., USA: IEEE Press, 2013. [Online]. http://dl.acm.org/citation.cfm?id=2555729.2555753

[31] J. Coburn, A. M. Caulfield, A. Akel, L. M. Grupp, R. K. Gupta, R. Jhala, and S. Swanson, "Nv-heaps: making persistent objects fast and safe with next-generation, non-volatile memories," *ACM Sigplan Notices*, vol. 46, 2011.

[32] J. Ren, J. Zhao, S. Khan, J. Choi, Y. Wu, and O. Mutlu, "Thynvm: Enabling software-transparent crash consistency in persistent memory systems," in 2015 *48th International Symposium on Microarchitecture (MICRO)*. IEEE, 2015.

[33] A. Kolli, V. Gogte, A. Saidi, S. Diestelhorst, P. M. Chen, S. Narayanasamy, and T. F. Wenisch, "Language-level persistency," in *Proceedings of the 44th Annual International Symposium on Computer Architecture*. ACM, 2017.

[34] J. Zhao, S. Li, D. H. Yoon, Y. Xie, and N. P. Jouppi, "Kiln: Closing the performance gap between systems with and without persistence support," in 2013 *46th Annual International Symposium on Microarchitecture (MICRO)*. IEEE, 2013.

[35] S. Pelley, P. M. Chen, and T. F. Wenisch, "Memory persistency," in *ACM SIGARCH Computer Architecture News*, vol. 42, no. 3. IEEE Press, 2014.

[36] A. Kolli, J. Rosen, S. Diestelhorst, A. Saidi, S. Pelley, S. Liu, P. M. Chen, and T. F. Wenisch, "Delegated persist ordering," in 2016 *49th Annual IEEE/ACM International Symposium on Microarchitecture (MICRO)*. IEEE, 2016.

[37] S. Nalli, S. Haria, M. D. Hill, M. M. Swift, H. Volos, and K. Keeton, "An analysis of persistent memory use with whisper," in *Proceedings of the Twenty-Second International Conference on Architectural Support for Programming Languages and Operating Systems*. ACM, 2017.

[38] Intel, "Intel 64 and IA-32 Architectures Software Developer's Manual." [Online]. https://software.intel.com/sites/default/files/managed/39/c5/325462-sdm-vol-1-2abcd-3abcd.pdf

[39] D. Narayanan and O. Hodson, "Whole-system persistence," *ACM SIGARCH Computer Architecture News*, vol. 40, 2012.

We claim:

1. A method comprising:
    storing each encrypted data block, of a cyphertext page in a cyphertext file, with corresponding encrypted error correction code (ECC) bits in a persistent memory device (PMD), the encrypted ECC bits verify both an encryption counter value of an encryption operation and a plaintext block of the cyphertext page from a decryption operation; decrypting, using the decryption operation during a read operation of a memory controller on a secure processor, a respective one block of the cyphertext file and the corresponding encrypted ECC bits stored in the PMD using a current counter value to form the plaintext block and decrypted ECC bits;
    verifying the plaintext block with the decrypted ECC bits; and
    performing a security check of the encryption counter value in response to the plaintext block failing the verification, using the decrypted ECC bits.

2. The method of claim 1, wherein the decrypted ECC bits are configured to correct one or more errors in the plaintext block; and further comprising:
    in response to the plaintext block failing the verification, restoring a Merkle Tree (MT) by using a most-recent counter value of encryption counters to reconstruct the MT that has a restored root that matches a current root stored in the secure processor.

3. The method of claim 2, further comprising:
    repeating the decryption operation for a set of N counter values to find the most-recently used counter value that produces a successful check of the plaintext block to recover a valid counter value, wherein N is an integer greater than 1; and
    overwriting a counter memory location associated with the recovered counter value based on the valid counter value.

4. The method of claim 2, further comprising:
    updating, by the processor, memory counters in the PMD only when a respective current counter value is evicted from a counter cache; and
    finding the most-recent counter value either in the counter cache or by fetching it from the PMD, in response to determining a miss has occurred wherein a counter value is persisted once each Nth update to effectuate a write-through for the Nth update of each counter value.

5. The method of claim 2, further comprising, prior to restoring the MT:
    dropping, the most-recent counter value of the encryption counters;
    perform run-time recovery of the most-recent value of the encryption counter; and
    iteratively trying multiple possible counter values on each counter miss to recover the most-recent counter value before verifying through the restored Merkle Tree.

6. The method of claim 1, further comprising performing a system recovery by the processor including:
    traversing all memory location cachelines in the PMD wherein:
    for each cacheline location, using an ECC value representative of the decrypted ECC bits after the decryption operation, as a check of the counter value retrieved from the PMD;
    in response to the counter value failing the check, recovering a most-recently used counter value upon checking all possible N values;
    in response to recovering the most-recently used counter value, overwriting a current counter in PMD with the recovered counter value; and
    reconstructing the Merkle Tree with the recovered counter value, after traversing all cachelines, by building up all intermediate nodes and resultant root.

7. The method of claim 6, further comprising:
    comparing the resultant root with a persisted root in the secure processor; and
    in response to a mismatch between the resultant root and the persisted root based on the comparison, providing a response signal indicative of data integrity of the PMD being unverifiable.

8. The method of claim 1, further comprising performing a write operation by the memory controller, wherein the write operation comprising:
    in response to a raw data block being evicted from a left level cache (LLC), calculating an ECC of the data of the raw data block;
    obtaining a corresponding current counter value in response to a miss detected and evict/write-back the evicted counter block, in response to determining that the raw data block is dirty;
    generating, using the corresponding current counter value, an encryption pad;
    verifying, the counter value in response to the detected miss; and
    updating the counter with the verified counter value and affected MT including a MT root based on the updated verified counter value.

9. The method of claim 1, further comprising performing a read operation from the PMD by the memory controller, wherein the performing includes:
    obtaining the corresponding counter value from the counter cache if found in the counter cache or the PMD, in a case of a miss and evict the victim block, if dirty;
    generating an encryption pad as a function of the obtained counter value;
    reading an encrypted data block of a requested cyphertext file from the PMD;
    decrypting, using the encryption pad, the encrypted data block;
    perform ECC checking of the data associated with the decrypted data block to verify the decrypted data;
    verifying an integrity of the counter value; and
    receiving by the memory controller the decrypted data.

10. A secure processor coupled to a tangible, non-transitory persistent memory device (PMD) to store each encrypted data block, of a cyphertext page in a cyphertext file, with corresponding encrypted error correction code (ECC) bits, the processor comprising:
a memory controller configured to interface with the PMD;
an encryption/decryption engine configured to decrypt, using a decryption operation during an operation of the memory controller, a respective one block of the cyphertext file and the corresponding encrypted ECC bits stored in the PMD using a current counter value to form the plaintext block and decrypted ECC bits and verify via a verification module in the engine the plaintext block with the decrypted ECC bits; and
a processing unit configured to execute instruction of a security check module to perform a security check of an encryption counter values in response to the plaintext block failing the verification, using the decrypted ECC bits wherein the encrypted ECC bits verify both the encryption counter value of an encryption operation and raw data of a plaintext block of the cyphertext page from the decryption operation.

11. The processor of claim 10, wherein the decrypted ECC bits are configured to correct one or more errors in the plaintext block; and the processing unit configured to execute instructions of a Merkle Tree (MT) restoration module to restore a Merkle Tree (MT) by using a most-recent counter value of encryption counters to reconstruct the MT that has a restored root that matches a current root stored in the secure processor, in response to the plaintext block failing the verification.

12. The processor of claim 11, the processing unit further configured to:
repeat the decryption operation for a set of N counter values to find the most-recently used counter value that produces a successful check of the plaintext block to recover a valid counter value, wherein N is an integer greater than 1; and
overwrite a counter memory location in a counter cache associated with the recovered counter value based on the valid counter value.

13. The processor of claim 11, wherein the memory controller configured to:
update memory counters in the PMD only when a respective current counter value is evicted from a counter cache; and the processing unit configured to find the most-recent counter value either in the counter cache or by fetching it from the PMD, in response to determining a miss has occurred wherein a counter value is persisted once each Nth update to effectuate a write-through for the Nth update of each counter value.

14. The processor of claim 11, wherein the processing unit further configured to: prior to restoring the MT:
drop the most-recent counter value of the encryption counters;
perform run-time recovery of the most-recent value of the encryption counter; and
iteratively try multiple possible counter values on each counter miss to recover the most-recent counter value before verifying through the restored Merkle Tree.

15. The processor of claim 10, wherein the processor further configured to: perform a system recovery, wherein during the system recovery the processor to:
traverse all memory location cachelines in the PMD wherein:
for each cacheline location, use an ECC value representative of the decrypted ECC bits after the decryption operation, as a check of the counter value retrieved from the PMD;
in response to the counter value failing the check, recovering a most-recently used counter value upon checking all possible N values;
in response to recovering the most-recently used counter value, overwrite a current counter in PMD with the recovered counter value; and
reconstruct the Merkle Tree with the recovered counter value, after traversing all cachelines, by building up all intermediate nodes and resultant root.

16. The processor of claim 15, wherein the processing unit executes a verification module configured to:
compare the resultant root with a persisted root in the secure processor; and
in response to a mismatch between the resultant root and the persisted root based on the comparison, provide a response signal indicative of data integrity of the PMD being unverifiable.

17. The processor of claim 10, wherein the memory controller configured to perform a write operation, wherein during the write operation one of the memory controller and the processing unit to:
in response to a raw data block being evicted from a left level cache (LLC), calculate an ECC of the data of the raw data block;
obtain a corresponding current counter value in response to a miss detected and evict/write-back the evicted counter block, in response to determining that the raw data block is dirty;
generate, using the corresponding current counter value, an encryption pad prepared by the engine;
verify, the counter value in response to the detected miss; and
update the counter with the verified counter value and affected MT including a MT root based on the updated verified counter value.

18. The processor of claim 10, wherein the memory controller configured to perform a read operation from the PMD by the memory controller, wherein during the read operation the one of the memory controller and the processing unit to:
obtain the corresponding counter value from the counter cache if found in the counter cache or the PDM, in a case of a miss and evict the victim block, if dirty;
generate an encryption pad by the engine as a function of the obtained counter value;
read an encrypted data block of a requested cyphertext file from the PMD;
decrypt, using the encryption pad, the encrypted data block;
perform ECC checking of the data associated with the decrypted data block to verify the decrypted data;
verify an integrity of the counter value; and
receive by the memory controller the decrypted data.

19. A system comprising:
a persistent memory device to store each encrypted data block, of a cyphertext page in a cyphertext file, with corresponding encrypted error correction code (ECC) bits, the encrypted ECC bits verify both an encryption counter value of an encryption operation and a plaintext block of the cyphertext page from a decryption operation;

a secure processor comprising a memory controller configured to:
- decrypt, using the decryption operation during a read operation of a memory controller, a respective one block of the cyphertext file and the corresponding encrypted ECC bits stored in the PMD using a current counter value to form the plaintext block and decrypted ECC bits;
- verify the plaintext block with the decrypted ECC bits; and
- perform a security check of the encryption counter value in response to the plaintext block failing the verification, using the decrypted ECC bits.

20. The system of claim 19, wherein the decrypted ECC bits are configured to correct one or more errors in the plaintext block; and
- the processor further configured to in response to the plaintext block failing the verification, restore a Merkle Tree (MT) by using a most-recent counter value of encryption counters to reconstruct the MT that has a restored root that matches a current root stored in the secure processor.

* * * * *